United States Patent
Watanabe

(10) Patent No.: US 7,092,040 B1
(45) Date of Patent: Aug. 15, 2006

(54) DYNAMIC IMAGE SEARCH INFORMATION RECORDING APPARATUS AND DYNAMIC IMAGE SEARCHING DEVICE

(75) Inventor: Shuichi Watanabe, Chiba (JP)

(73) Assignee: Sharp Kabushiki Kaisha, Osaka (JP)

( * ) Notice: Subject to any disclaimer, the term of this patent is extended or adjusted under 35 U.S.C. 154(b) by 548 days.

(21) Appl. No.: 10/019,747

(22) PCT Filed: Jun. 30, 2000

(86) PCT No.: PCT/JP00/04299

§ 371 (c)(1),
(2), (4) Date: Dec. 21, 2001

(87) PCT Pub. No.: WO01/03005

PCT Pub. Date: Jan. 11, 2001

(30) Foreign Application Priority Data

Jun. 30, 1999 (JP) .................................. 11-184606
Nov. 30, 1999 (JP) .................................. 11-339019

(51) Int. Cl.
*H07N 5/14* (2006.01)
*H07N 7/12* (2006.01)

(52) U.S. Cl. ............. 348/700; 375/240.08; 375/240.24

(58) Field of Classification Search ........... 375/240.08, 375/240.24, 240.26, 240.07, 240.13; 707/1, 707/104.1; 382/173; 348/700
See application file for complete search history.

(56) References Cited

U.S. PATENT DOCUMENTS

| | | | |
|---|---|---|---|
| 5,485,611 A | * | 1/1996 | Astle ............................... 707/1 |
| 5,719,643 A | | 2/1998 | Nakajima .................... 348/701 |
| 5,778,108 A | | 7/1998 | Coleman, Jr. |
| 5,805,733 A | * | 9/1998 | Wang et al. ................. 382/232 |
| 5,819,286 A | * | 10/1998 | Yang et al. ...................... 707/1 |
| 6,400,890 B1 | * | 6/2002 | Nagasaka et al. ............. 386/69 |

FOREIGN PATENT DOCUMENTS

CN     1206987 A     2/1999

(Continued)

OTHER PUBLICATIONS

Kobla et al, "Indexing and Retrieval of the MPEG Compressed Video" *Journal of Electronic Imaging*, vol. 7(2) Apr. 1998, pp. 294-307.

(Continued)

*Primary Examiner*—Gims Philippe
*Assistant Examiner*—Erick Rekstad
(74) *Attorney, Agent, or Firm*—David G. Conlin; William J. Daley, Jr.; Edwards, Angell, Palmer & Dodge LLP

(57) ABSTRACT

A motion picture retrieval information storage apparatus (40) storing retrieval information for retrieving a motion picture, expressed by motion picture data, and constituted of one or more partial motion pictures (140, 142, 144, 146, 160) on the time axis includes a retrieval information generating section (102, 103, 104, 105) generating retrieval information corresponding to each of the one or more partial motion pictures on the basis of the motion picture data and a storage section (106) storing said retrieval information into a storage medium together with a correspondence information between the retrieval information and the motion picture data, wherein retrieval information generating section (102, 103, 104, 105) includes a first summary information generating section (103) for generating summary information (188) of one or more spatially partial motion pictures obtained by spatially splitting each of the one or more partial motion pictures (140, 142, 144, 146, 160) on the time axis.

13 Claims, 18 Drawing Sheets

FOREIGN PATENT DOCUMENTS

| | | |
|---|---|---|
| EP | 0 866 409 | 9/1998 |
| EP | 0 878 767 | 11/1998 |
| EP | 0 907 147 A 2 | 4/1999 |
| JP | 5-46769 | 2/1993 |
| JP | 6-153146 | 5/1994 |
| JP | 07038842 | 2/1995 |
| JP | 7-152779 | 6/1995 |
| JP | 9-83864 | 3/1997 |
| JP | 9-284702 | 10/1997 |
| WO | WO 98/55942 | 12/1998 |

OTHER PUBLICATIONS

Application of MPEG Motion Vectors to Video Retrieval; Proceedings of 1999 IEICE General Conference;Mar. 25, 1999;Miyasaka et al., p. 12.

Kasutani, et al. "Proposal of Rapid Video Retrieval Method Using Motion Vectors in Compressed Video," The Collection of Articles of the 1996 IEICE Information and System Society Conference, the Insitute of Electronics, Information and Communication Engineers, Sep. 21, 1996, p. 278, D-276—Inventor's Comments.

Kasutani, et al. "Proposal of Rapid Dection And Retrieval Using Parameters in Compressed Video," a study report in the Information Processing Society of Japan, the IPSJ, Japan, Jun. 6, 1997, vol. 97, No. 58, pp. 25-32 (97-AVM-17-5)—Abstract Only.

Nagasaka, et al. "Video Retrieval Method Using A Sequence Of Representative Images In A Scene", Proceedings of IAPR Workshop On Machine Vision Applications, Dec. 13, 1994, pp. 79-82.

Idris, et al. "Spatio-Temporal Indexing Of Vector Quantized Video Sequences", IEEE Transactions On Circuits And Systems For Video Technology, IEEE Inc. vol. 7, No. 5, Oct. 1, 1997 pp. 728-740.

* cited by examiner

SCENE UNIT RETRIEVAL
INFORMATION

FIG.18

| SPLITTING NUMBER SPECIFYING FLAG | THE NUMBER OF SPLITTINGS |
|---|---|
| 0 | 2×2 |
| 1 | 4×4 |
| 2 | 8×8 |
| 3 | 16×16 |

($2^2$ SPLITTING)

($2^3$ SPLITTING)

($2^4$ SPLITTING)

($2^5$ SPLITTING)

($2^6$ SPLITTING)

DYNAMIC IMAGE SEARCH INFORMATION RECORDING APPARATUS AND DYNAMIC IMAGE SEARCHING DEVICE

TECHNICAL FIELD

The present invention relates to an apparatus storing information for retrieving a motion picture (a motion picture retrieval information storage apparatus) and an apparatus for retrieving a motion picture (a motion picture retrieving apparatus), and more particularly, to a motion picture retrieval information storage apparatus and a motion picture retrieving apparatus, capable of efficiently retrieving and taking out a desired scene among plural scenes constituting a motion picture.

BACKGROUND ART

With improvement on performance of a computer, realization of a storage apparatus having a large capacity, expansion of a communication infrastructure and other progresses, a service or the like has been coming into wide spread use that maintains a data base of a large amount of pictures and delivers a necessary picture when a necessity arises. Since a technology for digitizing a picture has progressed, an individual can build a data base of motion pictures.

When a data base of motion pictures has been built, then how to retrieve a desired picture therefrom becomes a problem. The present invention relates to an improvement on such a technology for retrieval of a motion picture.

The term "motion picture" used in the present specification includes both types of motion picture data not processed and constituted of RGB (Red, Green and Blue) signals and motion picture data digitized and coded according to a motion picture compression format as is in MPEG (Moving Picture Experts Group) or the like.

The term "scene" means a constituent unit of a motion picture including a consecutive plural picture frames and for example, of a motion picture obtained in one time shooting from the start to the end of recording or a motion picture for which editing has been finished, a length of the motion picture partitioned with two edit points at both ends thereof. An edit point includes, in a case, special effects such as fading and a dissolve. Furthermore, one scene may include plural scenes.

The term "a scene change point" means a position on the time axis at which two scenes are switched over therebetween and a leading frame directly after a scene is switched is referred to as "a scene change frame."

The term "a key frame" means a distinctive frame utilized in retrieval or the like, representing a scene or all of a motion picture.

A motion picture data is "contents" constituted of image information changing along the time axis. Motion picture data becomes an object of retrieval in the entirety. Therefore, the simplest method for retrieval of a desired motion picture is to select a desired motion picture by seeing all of a motion picture. However, it takes a time to see all of a motion picture. Therefore, when the number of motion pictures registered at a data base increases, it takes an extremely long time to take out a desired motion picture. Accordingly, this method is unrealistic.

In a generally adopted method for efficient retrieval of a motion picture, various kinds of information for retrieval (retrieval information) representing contents of respective motion pictures are prepared so as to be ready for use in retrieval of the respective motion pictures and retrieval is performed on the basis of the retrieval information.

Information used as retrieval information includes information attached to a picture (attached information), information expressing characteristics of a picture (characteristic information) and information expressing an outline of a picture (outline information). The attached information includes a title or a descriptive text prepared accompanying a motion picture. The characteristic information includes information expressing characteristics of a picture such as a frequency of a luminance value derived from a picture signal, motion information between frames, or the like. The outline information includes information of scene change points, key frames, or the like, which are determined by characteristic information of a picture or an input from the outside.

Of the above-described information, the characteristic information is especially convenient and important. For example, a key frame representing a motion picture can be selected by using characteristic information. The characteristic information is easily digitized and if a characteristic of a desired motion picture is digitized in the form of characteristic information, it can be easy to extract a motion picture having a characteristic coinciding with a requested characteristic information. In the following description, the term "retrieval information" means this characteristic information.

In general, a motion picture includes plural scenes. When a retriever retrieves a motion picture, the retrieval is performed in order to find out a desired frame or a desired scene included in a motion picture or one of a plurality of motion pictures which are an object for retrieval. A fundamental method for finding out a desired frame or a scene in a motion picture using retrieval information is to follow a procedure in which retrieval information relating to frames or retrieval information relating to scenes is obtained in advance and a frame or a scene is selected on the basis of such retrieval information.

An apparatus and process are disclosed in Japanese Patent Laying-Open No. 9-284702 in connection with this point in which a total sum of motion vectors of each frame and a continuity of a plurality of small regions constituting a frame, in a frame and between frames are adopted as feature of a frame for detection of a scene change point.

Furthermore, a control method is disclosed in Japanese Patent Laying-Open No. 7-38842 in a case where the average of motion vectors in magnitude and color histograms of pictures in each scene are used as a feature of the scene and a representative picture of each scene is displayed as a picture index.

If an apparatus for storing information for retrieving a motion picture (a motion picture retrieval information storage apparatus) and an apparatus for retrieving a motion picture (a motion picture retrieving apparatus) are fabricated, taking into consideration such prior art techniques, the apparatuses will be as shown below.

Referring to FIG. 1, a prior art motion picture retrieval information storage apparatus which is assumed includes: an analysis section 601 for analyzing inputted motion picture data to divide the data into scenes and output information expressing a structure of a motion picture such as scene dividing positions (scene change); a retrieval information generating section 602 for a frame unit, connected so as to receive an output of analysis section 601 and inputted motion picture data and for generating and outputting summary information of a picture such as a total sum of motion vectors corresponding to each of frames in a scene as retrieval information on the basis of motion picture structure information and motion picture data outputted from analysis section 601; a retrieval information generating section 603 for a scene unit, connected so as to receive an output of retrieval information generating section 602 for a frame unit and generating and outputting summary information such as the average value of motion vectors in magnitude for all of a scene as retrieval information on the basis of summary information of a frame unit outputted from retrieval information generating section 602 for a frame unit; a retrieval information generating section 604 for a motion picture for arranging, into a prescribed format, motion picture structure information outputted from analysis section 601, retrieval information of each frame outputted from retrieval information generating section 602 for a frame unit and retrieval information for all of a scene outputted from retrieval information generating section 603 for a scene unit to generate and output retrieval information corresponding to a motion picture; and a storage section 605 for storing original motion picture and the retrieval information corresponding to a motion picture outputted from retrieval information generating section 604 for a motion picture, in a state of both being related to each other, into a storage medium 606.

Note that one frame can be considered to be a unit of a motion picture obtained by temporal division of the motion picture. Hence, a frame can be called as one example of a temporally divided block.

In this specification, a notation of "retrieval information of a frame unit" is used for expressing retrieval information provided with a frame as a unit. Similarly, a notation of "retrieval information of a scene unit" is used for expressing retrieval information provided with a scene as a unit.

Referring to FIG. 2, a prior art motion picture retrieving apparatus which is assumed includes: a read-out section 701 for reading out motion picture retrieval information and motion picture data from storage medium 606; a retrieval information managing section 702 for holding each motion picture retrieval information supplied from read-out section 701 and receiving a request for retrieval information to output retrieval information of a scene unit and retrieval information of a frame unit together with structure information of a motion picture; a retrieval executing section 703 for a scene unit for receiving a request for retrieval with a scene as a unit to request retrieval information of a scene unit and motion picture structure information from retrieval information managing section 702 and detecting a scene meeting the retrieval request on the basis of the retrieval information of a scene unit and the motion picture structure information of a scene received to output information on the detected scene; a retrieval executing section 704 for a frame unit for receiving a request for retrieval with a frame as a unit to request retrieval information of a frame unit in a scene and motion picture structure information from retrieval information managing section 702 and detecting a scene or a frame meeting the retrieval request on the basis of the retrieval information of a frame unit in a scene and the motion picture structure information received to output information on the detected scene or frame; a data managing section 705 for taking out and outputting picture data corresponding to a detected scene or frame through read-out section 701 on the basis of information on the detected scene or information on the detected frame, outputted from retrieval executing section 703 for a scene unit and retrieval executing section 704 for a frame unit; and a retrieval control section 706 for responding to a retrieval instruction given by an operator to provide a retrieval request to retrieval executing section 703 for a scene unit or retrieval executing section 704 for a frame unit, and for repeating a process displaying motion picture data provided from data managing section 705 as a retrieval result to output the retrieval result at the end of retrieval.

The apparatus shown in FIG. 1 is considered to operate as follows: When motion picture data is inputted, analysis section 601 divides motion picture data into scene units. Analysis section 601 further outputs motion picture structure information.

Retrieval information generating section 602 for a frame unit generates summary information corresponding to a frame in a scene on the basis of motion picture structure information outputted from analysis section 601 and motion picture data. Retrieval information generating section 602 for frame unit further outputs the summary information thus generated to retrieval information generating section 603 for a scene unit and retrieval information generating section 604 for a motion picture as retrieval information.

Retrieval information generating section 603 for a scene unit generates summary information for all of a scene on the basis of the summary information of a frame unit provided from retrieval information generating section 602 for a frame unit. Retrieval information generating section 603 for a scene unit further provides the summary information thus generated to retrieval information generating section 604 for a motion picture as retrieval information.

Retrieval information generating section 604 for a motion picture receives motion picture structure information, retrieval information of a frame unit and retrieval information for all of a scene, from analysis section 601, retrieval information generating section 602 for a frame unit and retrieval information generating section 603 for a scene unit, respectively, and generates retrieval information corresponding to a motion picture, arranging the information into a prescribed format. Retrieval information generating section 604 for a motion picture provides the retrieval information corresponding to a motion picture thus generated to storage section 605.

Storage section 605 stores original motion picture data and the retrieval information provided from retrieval information generating section 604 for a motion picture into storage medium 606. At this time, storage section 605 attaches information indicating that the motion picture data and the retrieval information, to be both stored there, correspond with each other, to one or both of the motion picture data and the retrieval information; or stores the information of the correspondence separately from the motion picture data and the retrieval information.

Referring to FIG. 2, it is assumed that the prior art retrieving apparatus operates in the following way: At the start of retrieval, an operator gives a retrieval instruction to retrieval control section 706. Retrieval control section 706 selects retrieval of a scene unit or retrieval of a frame unit in response to the retrieval instruction.

It is assumed that, for example, retrieval of a scene is selected. Then, retrieval control section 706 provides a retrieval request to retrieval executing section 703 for a scene unit. Retrieval executing section 703 for a scene unit responds to this request to request retrieval information of a scene unit and motion picture structure information from retrieval information managing section 702 and receives the retrieval information of a scene unit and motion picture structure information outputted from retrieval information managing section 702.

Retrieval executing section 703 for a scene unit detects a scene meeting the retrieval request provided from retrieval control section 706 on the basis of the retrieval information and the motion picture structure information of a scene unit.

Retrieval executing section 703 for a scene unit outputs information on the detected scene to data managing section 705.

Data managing section 705 reads out corresponding picture data from storage medium 606 through read-out section 701 on the basis of information on a scene provided from retrieval executing section 703 for a scene unit to provide the picture data to retrieval control section 706.

Retrieval control section 706 displays the picture data. The operator sees the displayed picture data to determine a next retrieval policy and gives a next retrieval instruction to retrieval control section 706. The similar process is repeated hereinafter.

A picture that the operator desires to take out from the data base is taken out in such a way, and then the retrieval finishes. A retrieval result is outputted from retrieval control section 706.

In the prior art, retrieval information of a scene is generated on the basis of retrieval information of frame units included in the scene. This is because of general understanding that the minimum unit constituting a scene is a frame.

Retrieval information of a scene is generated on the basis of retrieval information of frame units in such a way and then spatial features in each frame obtained by splitting the frame into small regions (retrieval information of a screen-split block units) can be used as retrieval information. However, a problem has been encountered since in a prior art apparatus, spatial features of a picture over all of a scene having a length on the time axis cannot be handled. In the present specification, such spatial features of a picture over all of a scene is referred to as "retrieval information of a spatially split block unit."

Consider, for example, a case where a scene is taken out that has a feature that an object in a vigorous motion is displayed in a middle portion of a screen. In the prior art, it was not able to take out such a scene from retrieval information of a scene unit but a necessity arose for retrieval using retrieval information attached to each of frames included in a scene. For this reason, in the prior art, such retrieval was performed with a very low efficiency.

The present invention has been made in light of the above-described problem and it is an object of the present invention to provide a motion picture retrieval information storage apparatus and a motion picture retrieving apparatus capable of efficiently performing retrieval of a motion picture using a new index expressing a feature of a scene with correctness.

It is another object of the present invention to provide a motion picture retrieval information storage apparatus and a motion picture retrieving apparatus capable of efficiently performing retrieval of a motion picture by extracting not only a feature of a scene by dividing a scene into blocks on the time axis but also another feature by splitting the scene only spatially without dividing the scene on the time axis.

It is still another object of the present invention to provide a motion picture retrieval information storage apparatus and a motion picture retrieving apparatus capable of efficiently performing retrieval of a motion picture using a new index expressing a feature of a scene with correctness, with an small amount of information for the retrieval.

DISCLOSURE OF THE INVENTION

A motion picture retrieval information storage apparatus relating to the present invention includes: a retrieval information generating section generating retrieval information corresponding to each of one or more partial motion pictures on the time axis, on the basis of motion picture data and motion picture structure information that divides a motion picture expressed by the motion picture data on the time axis into one or more partial motion pictures on the time axis; and a storage section storing the retrieval information and the motion picture structure information into a storage medium together with the corresponding motion picture data. The retrieval information generating section includes a first summary information generating section for generating summary information of one or more spatially partial motion pictures obtained by spatially splitting each of one or more partial motion pictures on the time axis.

Summary information is generated from spatially partial motion pictures obtained by spatially splitting each of partial motion pictures on the time axis. This summary information has been introduced into the present invention in the art for the first time and is not information obtained from a temporal part of the partial motion pictures on the time axis. This summary information is obtained from a spatially partial motion picture being only a part of the motion picture on the spatial domain, but residing over all of the partial motion picture on the time axis. Therefore, this summary information expresses a spatial feature of the partial motion pictures over all of the partial motion picture on the time axis. By use of the new index, a retrieval is efficiently performed with more of emphasis placed on a spatial feature of the partial motion picture than on a temporal feature thereof.

A motion picture retrieving apparatus relating to another aspect of the present invention is a motion picture retrieving apparatus for retrieving a desired picture using retrieval information corresponding to each of one or more partial motion pictures constituting a motion picture. Motion picture data expressing the motion picture is related with retrieval information and the retrieval information includes summary information of one or more spatially partial motion pictures obtained by spatially splitting each of one or more partial motion pictures on the time axis. A motion picture retrieving apparatus relating to the present invention includes: a information extracting section for reading and managing retrieval information; and a first partial motion picture retrieving section, connected with the information managing section, and for retrieving a partial motion picture on the time axis meeting a first retrieval request in response to the first retrieval request with a partial motion picture on the time axis as a retrieval unit, provided from the outside, using summary information of a spatially partial motion picture included in the retrieval information.

Summary information obtained from a spatially partial motion picture obtained by spatially splitting each of partial motion pictures on the time axis has been newly introduced into the present invention in the art and is obtained from a spatially partial motion picture being only a part of the motion picture on the spatial domain, but residing over all of the partial motion picture on the time axis. Hence, this summary information expresses a spatial feature of the partial motion pictures over all of the partial motion picture on the time axis. Therefore, according to a motion picture retrieving apparatus relating to the present invention, by use of the new index, a retrieval can be efficiently performed with more of emphasis placed on a spatial feature of the partial motion picture than on a temporal feature thereof.

BRIEF DESCRIPTION OF THE DRAWINGS

FIG. 18 is a table showing a meaning of a value of a splitting number specifying flag;

BEST MODE FOR CARRYING OUT THE INVENTION

Figure 1:
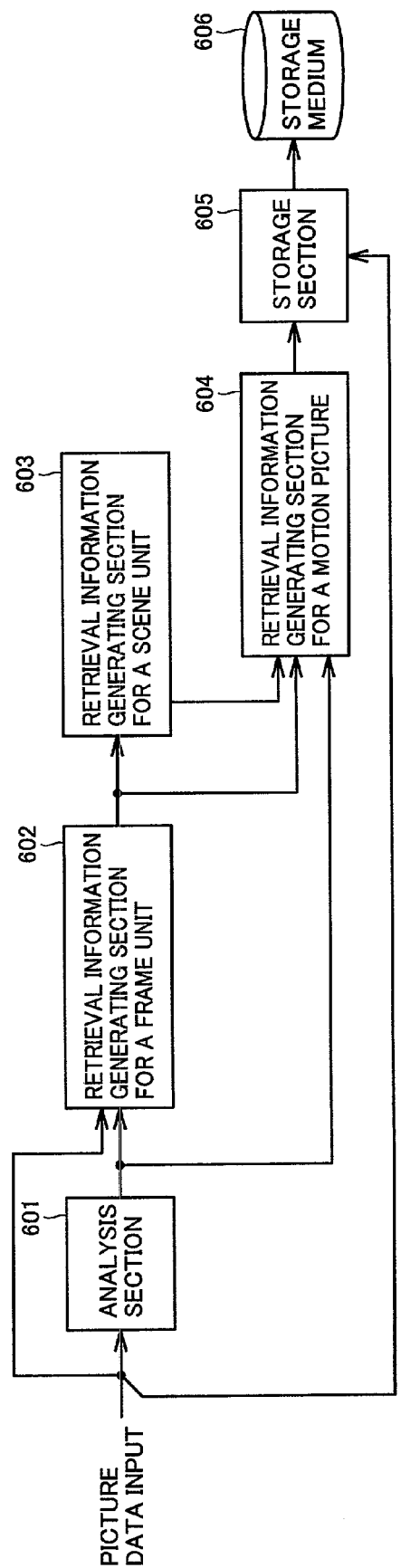
FIG. 1 is a schematic block diagram of an imaginary prior art motion picture retrieval information storage apparatus.
Figure 2:
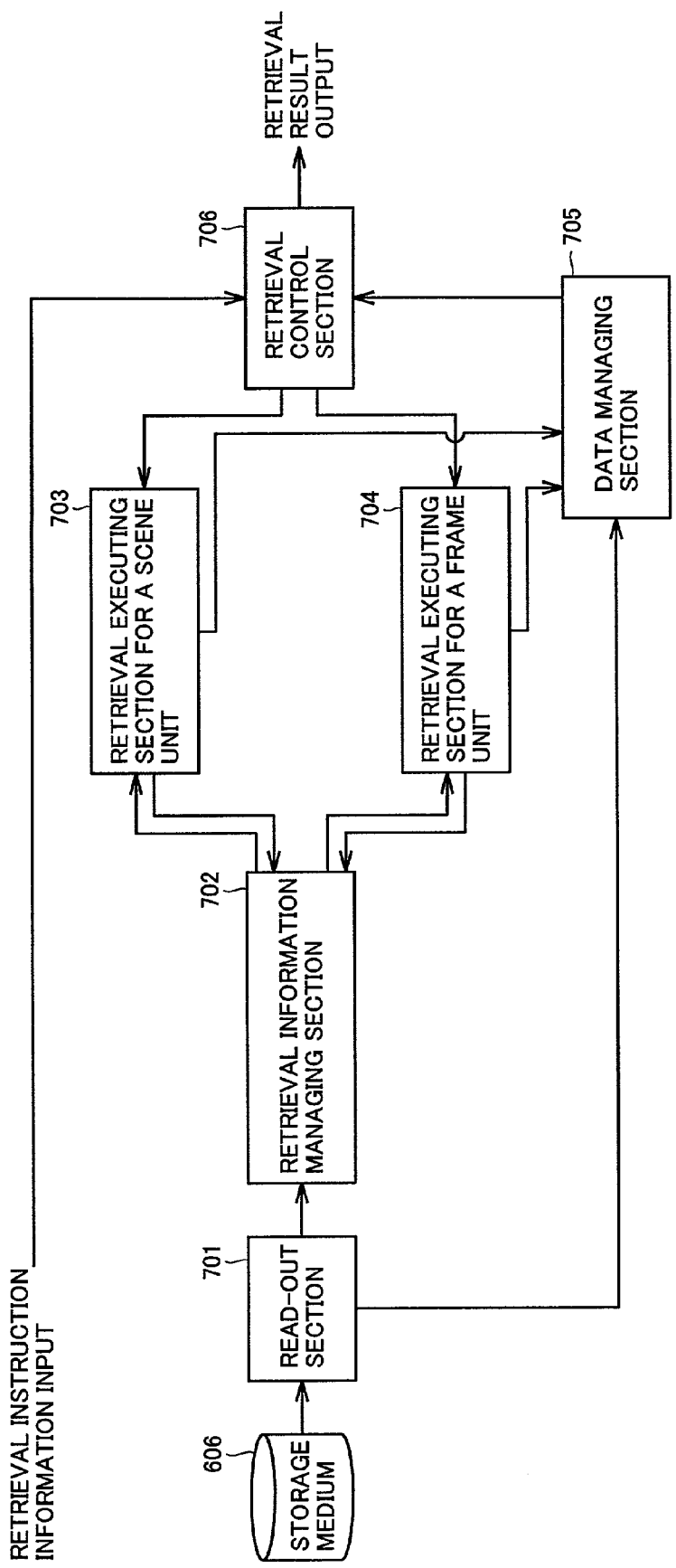
FIG. 2 is a schematic block diagram of an imaginary prior art motion picture retrieving apparatus.
Figure 3:
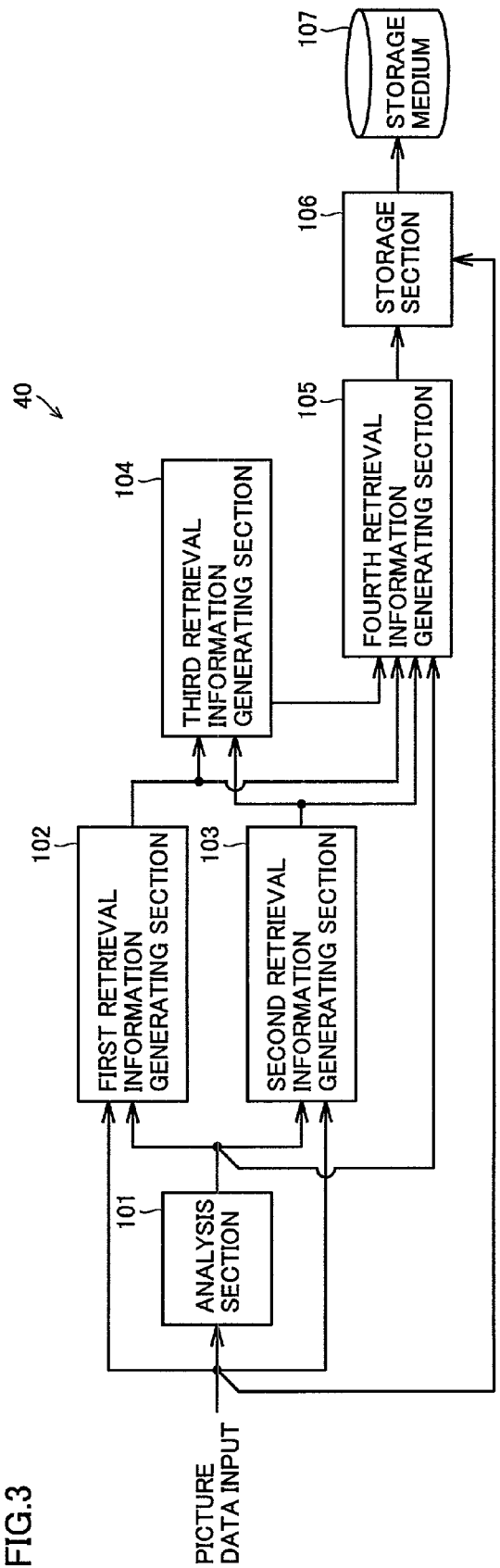
FIG. 3 is a block diagram of a motion picture retrieval information storage apparatus relating to one embodiment of the present invention.

FIG. 3 shows a block diagram of a motion picture retrieval information storage apparatus 40 relating to the embodiment. Referring to FIG. 3, motion picture retrieval information storage apparatus 40 includes: an analysis section 101 for receiving motion picture data and analyzing a structure of a motion picture to divide the data into scenes and output motion picture structure information such as scene change points; a first retrieval information generating section 102 for receiving the motion picture data and the motion picture structure information outputted from analysis section 101, and generating and outputting summary information of picture data of each of frames included in a scene (summary information with a temporally divided block called as a frame as a unit), a second retrieval information generating section 103 for receiving the motion picture structure information outputted from analysis section 101 and the motion picture data, and generating and outputting summary information of a spatially split block constituted of picture data at the same split block position of all of the frames in a scene as retrieval information of each of the scenes; a third retrieval information generating section 104 for receiving the summary information of each of the frames (temporally divided blocks) in a scene outputted from first retrieval information generating section 102 and/or the summary information of each of the spatially split blocks in a scene outputted from second retrieval information generating section 103 as inputs, generating and outputting summary information of all of the scene on the basis of the summary information from first retrieval information generating section 102 and/or the summary information from second retrieval information generating section 103; a fourth retrieval information generating section 105 for arranging the summary information outputted from first retrieval information generating section 102, the summary information outputted from second retrieval information generating section 103, the summary information outputted from third retrieval information generating section 104 and the motion picture structure information outputted from analysis section 101 into a prescribed format to thereby generate and output retrieval information corresponding to the motion picture; and a storage section 106 for receiving the retrieval information of the motion picture outputted from fourth retrieval information generating section 105 and the original motion picture data and storing correspondence information between the retrieval information and the original motion picture data or the like attaching the corresponding information or the like to one or both of the retrieval information and the original motion picture data, or the correspondence information or the like as separate data from the retrieval information and the original motion picture, into a storage medium 107.

Motion picture data that an apparatus of the present invention handles may be any of original picture signals such as RGB signals, and picture data encoded according to a motion picture compression format such as MPEG (Moving Picture Experts Group) or the like. In the embodiment, it is assumed for the sake of convenience in description that the motion picture data is encoded data.

More detailed description will be given of functions of blocks shown in FIG. 3 below: Analysis section 101 divides a motion picture into temporally small units (scenes). For this purpose, analysis section 101 performs detection of scene change points in motion picture data. Analysis section 101, in this example, detects a scene change point using frequency information in a frame in predictive mode of coded blocks included in encoded picture data.

Figure 4:
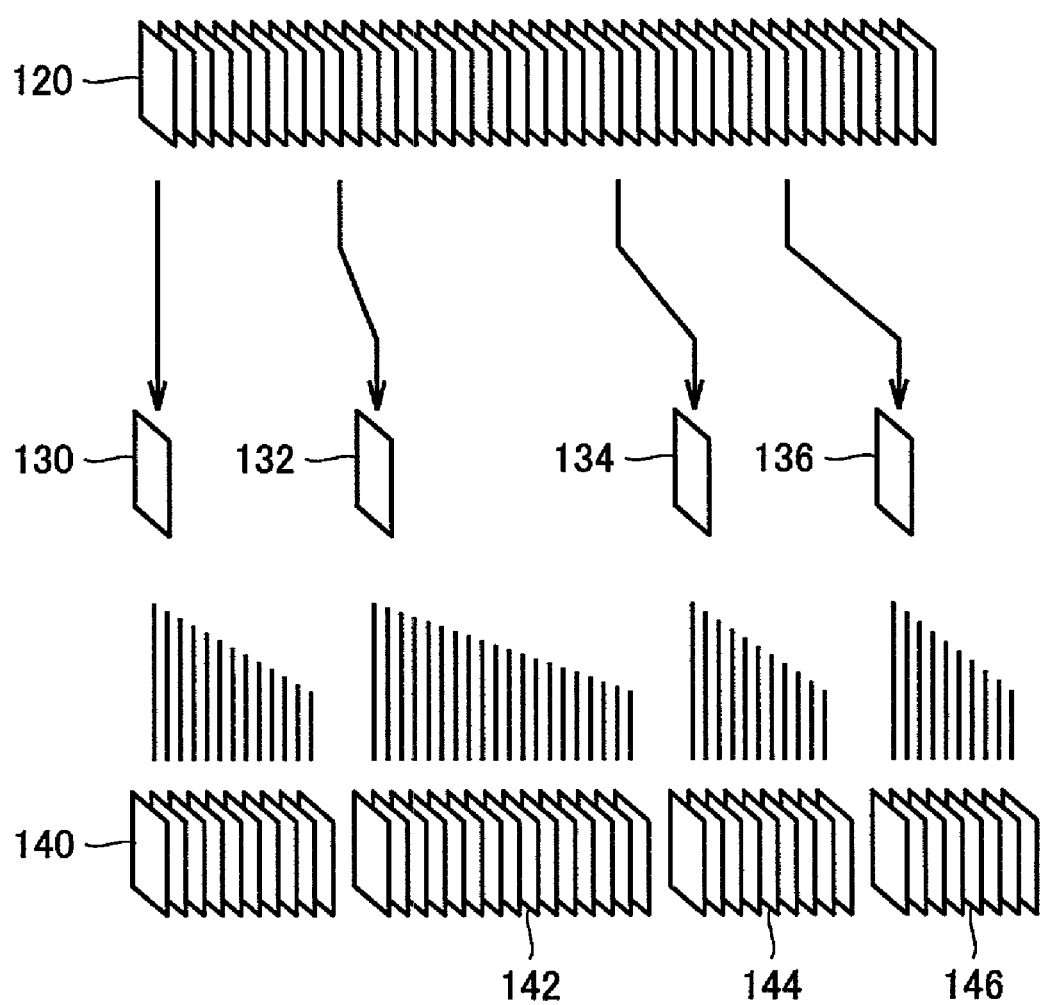
FIG. 4 is a representation showing a process in which a motion picture is divided into scenes in the motion picture retrieval information storage apparatus relating to the one embodiment of the present invention.

For example, referring to FIG. 4, analysis section 101 detects a first scene change frame 130, a second scene change frame 132, a third scene change frame 134 and a fourth scene change frame 136 of a motion picture 120. Thereby, analysis section 101 divides motion picture 120 into a first scene 140 constituted of picture data between first scene change frame 130 and second scene change frame 132 (including first scene change frame 130), a second scene 142 constituted of picture data between second scene change frame 132 and third scene change frame 134 (including second scene change frame 132), a third scene 144 constituted of picture data between third scene change frame 134 and fourth scene change frame 136 (including third scene change frame 134), and a fourth scene 146 constituted of picture data from fourth scene change frame 136 to the last frame of motion picture 120 (including fourth scene change frame 136). That is, analysis section 101 divides motion picture 120 into four scenes 140, 142, 144 and 146, in this example.

Analysis section 101 has a function of outputting information expressing positions in the picture data on first scene change frame 130, second scene change frame 132, third scene change frame 134, fourth scene change frame 136 and so on, as motion picture structure information.

Figure 5:
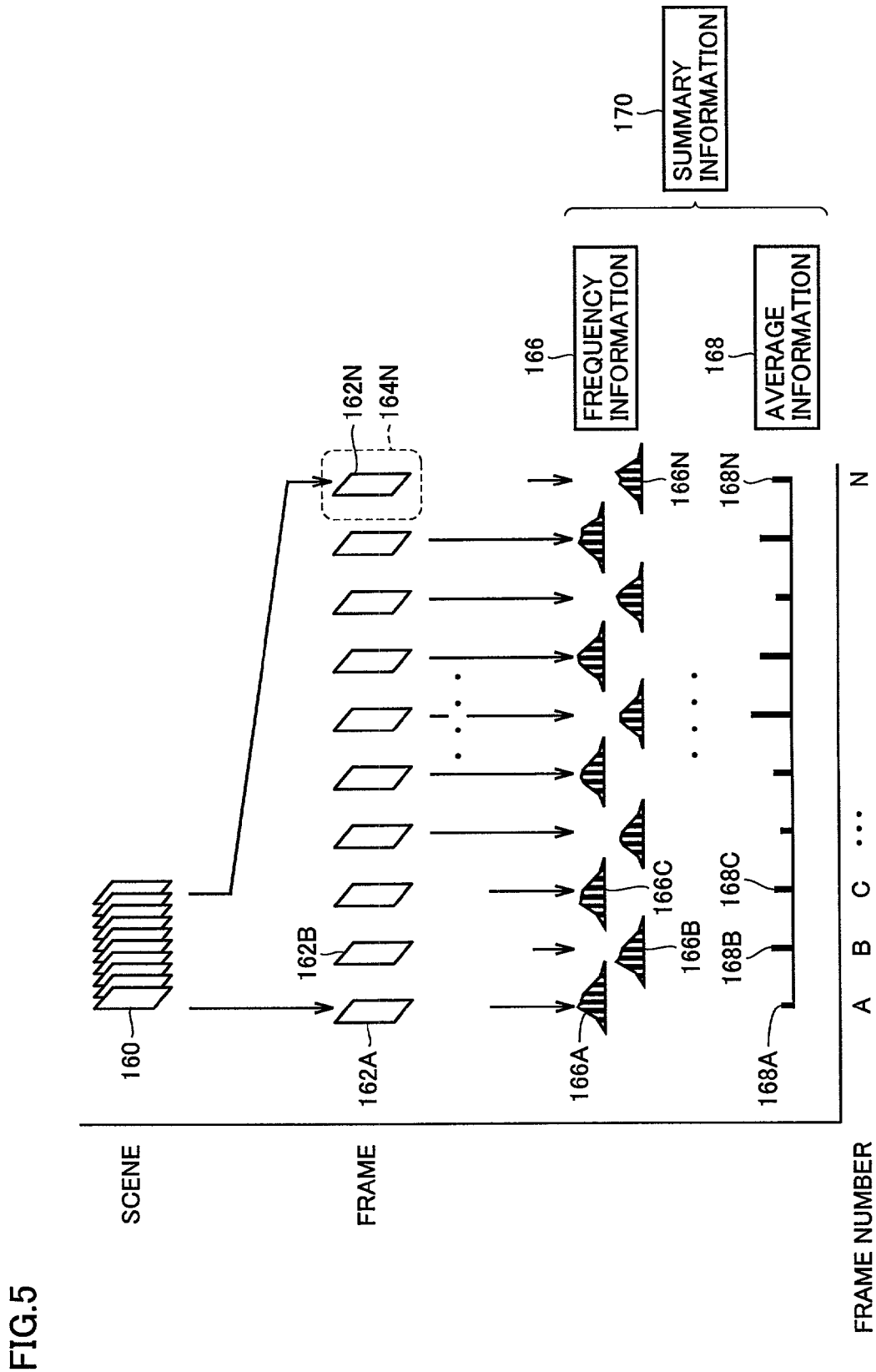
FIG. 5 is a representation showing a process in which retrieval information of a temporally divided block unit is generated in the motion picture retrieval information storage apparatus relating to the one embodiment of the present invention.

Referring to FIG. 5, first retrieval information generating section 102 performs the process as described below on a scene 160 obtained by dividing motion picture data on the basis of motion picture structure information outputted from analysis section 101 to prepare summary information of each of frames included in scene 160. Note that scene 160 includes picture data from a frame 162A to a frame 162N.

First retrieval information generating section 102 obtains frequency information 166A to 166N of motion vectors in respective frames 162A to 162N. Furthermore, first retrieval information generating section 102 obtains averages 168A to 168N of motion vectors in respective frames 162A to 162N.

Frequency information 166 and average information 168 thus obtained constitute a summary information 170 of each frame here. The summary information is given as a function of a frame number (that is a function of time).

The summary information is retrieval information obtained by compression of information spatially distributed in each of the frames included in scene 160. A frame is a kind of a temporally divided block since a frame is a unit obtained by temporally dividing a motion picture. Hence, summary information 170 can be said retrieval information of a temporally divided block unit.

Second retrieval information generating section 103 receives the motion picture structure information (information on scene change positions) outputted from analysis section 101 and the motion picture data. Second retrieval information generating section 103 generates summary information of a spatially split block using the motion picture structure information and the motion picture data in the following way.

Note that the spatially split block here is a block as described below: All of frames in one scene are each spatially split into plural split blocks in the same way. All of plural split blocks at corresponding positions on all of the respective frames are collectively called a spatially split block of the scene. Therefore, when one scene includes n frames and each frame is spatially split into m split blocks, the scene is split into m spatially split blocks and each spatially split block includes n split blocks.

Figure 6:
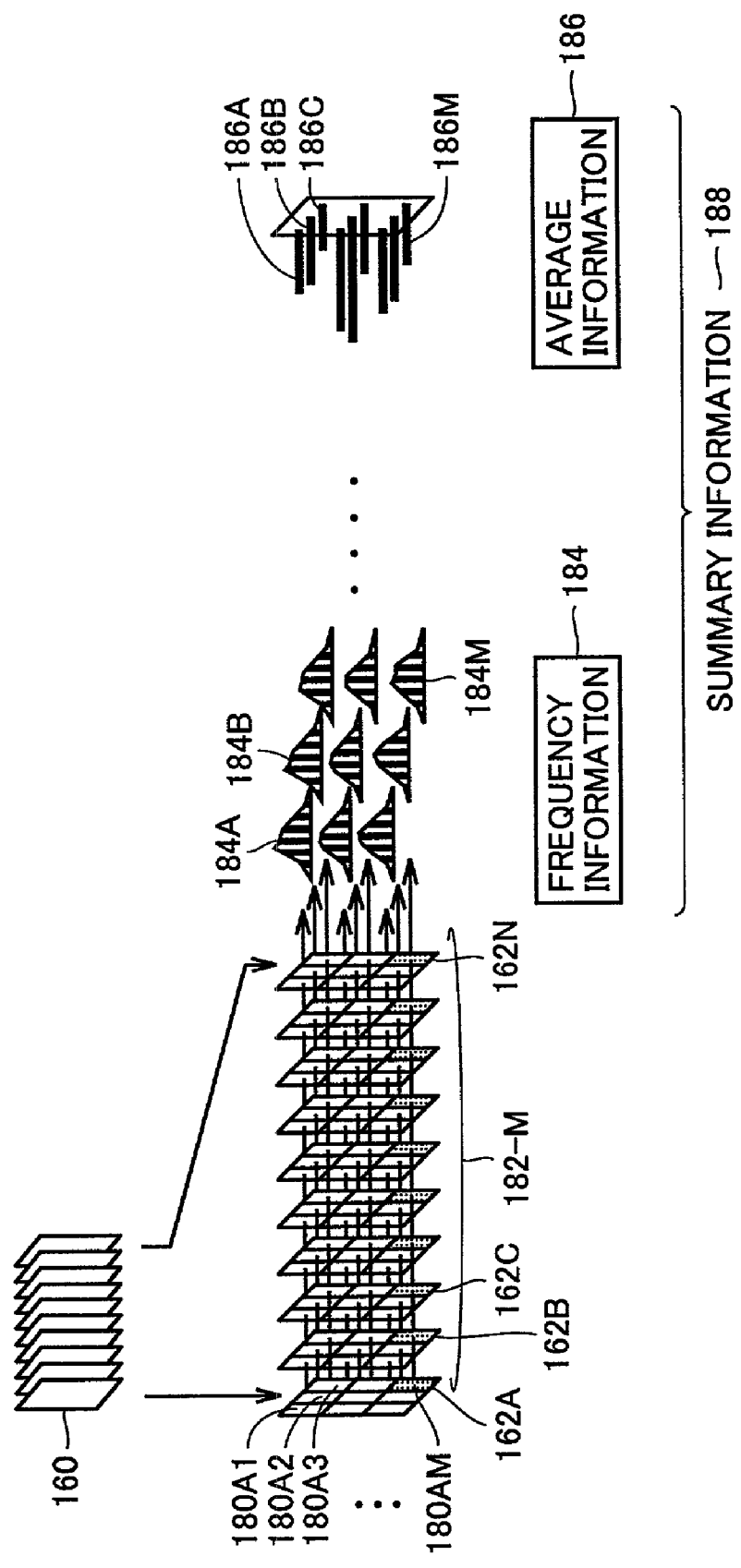
FIG. 6 is a representation showing a process in which retrieval information of a spatially split block unit is generated in the motion picture retrieval information storage apparatus relating to the one embodiment of the present invention.

Specifically, referring to FIG. 6, in second retrieval information generating section 103, the following process is applied to scene 160. As described previously, it is assumed that scene 160 includes a plurality of frames 162A to 162N. Frames 162A to 162N are each spatially split into M split blocks, wherein a split block means each of small regions obtained when a picture plane is split into a plurality of parts. For example, frame 162A shown in FIG. 6 is split into a plurality of split blocks 180A1 to 180AM. This applies to each of the other frames 162B to 162N.

One spatially split block of scene 160 is formed from split blocks at the same position on the plurality of frames 162A to 162N. For example, spatial split block 182-M is formed by a collection of the Mth split blocks of respective N frames (the number of elements is equal to N). The other spatial split blocks are formed in a similar way.

Summary information 188 is generated by compressing information distributed in the direction of the time axis for each of the M spatially split blocks thus obtained. Summary information 188 referred to herein is summary information of each spatially split block and a value of a function of a position (coordinates) in a frame of a split block included in each of the spatially split blocks.

Typically, summary information 188 includes frequency information 184 and average information 186. The frequency information in a spatial split block in a predictive mode of each encoded block or frequency information in a spatially split block of motion vectors in motion compensative prediction encoding can be used as frequency information 184. For example, frequency information 184A is obtained from a spatially split block 182-1, though not shown, and frequency information 184B is obtained from a spatially split block 182-2, though not shown and the other frequency information is obtained in a similar way; finally, frequency information 184M is obtained from a spatially split block 182-M.

A total sum or the average of motion vectors in a spatially split block can be used as average information 186. For example, average information 186A is obtained from a spatially split block 182-1, not shown, average information 186B is obtained from a spatially split block 182-2, not shown, and the other average information is obtained in a similar way; finally, average information 186M is obtained from a spatially split block 182-M.

In addition to the total sum and the average, as summary information, there also can be used a standard deviation or the like of motion vectors in a spatially split block.

Third retrieval information generating section 104 receives summary information outputted from first retrieval information generating section 102 and summary information outputted from second retrieval information generating section 103, and generates and outputs summary information of all of the scene on the basis of one or both of the summary information.

The summary information of all of a scene herein is retrieval information used in retrieval of the scene. As summary information of all of a scene, there can be used frequency information, the average, a standard deviation or the like of all of the scene with respect to motion vectors, luminance values, color differences or the like parameter.

In this specification, a notation of "retrieval information of a temporally divided block unit (frame unit)" is used for expressing retrieval information provided with a temporally divided block (frame) as a unit. Similarly, a notation of "retrieval information of a spatially split block unit" and "retrieval information of a scene unit" are used for expressing retrieval information provided with a spatially split block and a scene as a unit.

Fourth retrieval information generating section 105 arranges summary information outputted from first retrieval information generating section 102, summary information outputted from second retrieval information generating section 103, summary information outputted from third retrieval information generating section 104 and motion picture structure information outputted from analysis section 101 into a prescribed format to generate and output retrieval information corresponding to the motion picture and provide the retrieval information to storage section 106.

Storage section 106 receives the retrieval information corresponding to the motion picture, outputted from fourth retrieval information generating section 105 and the original motion picture data to store only the retrieval information or the retrieval information and the motion picture data into storage medium 107. At this time, storage section 106 stores information showing that the motion picture data and the retrieval information corresponds with each other, attaching to one or both of, or as separate data from, the motion picture data and the retrieval information.

Information of a magnitude of motion obtained on the basis of motion vectors included in motion compensative prediction-encoded motion picture data is used, as retrieval information adopted in a motion picture retrieval information storage apparatus 40 relating to the embodiment described above in connection to a structure and a general operation thereof.

Specifically, retrieval information of a temporally divided block (frame) unit is obtained for each of frames in a scene, as a total sum of the absolute values of motion vectors in all of a frame, obtained from the motion vectors attached to each of encoded blocks. Note that the retrieval information may be obtained as the average of the absolute values of motion vectors instead of the total sum of the absolute values of motion vectors with the same effect. Actually, if the number of encoded blocks included in one frame is determined, either a total sum or the average of the absolute values of motion vectors can be obtained from the other with ease.

A total sum of the absolute values of motion vectors in each of spatially split blocks is used as retrieval information of a spatially split block unit. Herein, too, the average of the absolute values of motion vectors can be used instead of the total sum of motion vectors. In a case where split blocks constituting a spatially split block coincides with encoded blocks, the number of motion vectors corresponding to each of the split blocks is 1. In a case where each split block includes a plurality of encoded blocks, the number of motion vectors corresponding to each of the split blocks is equal to the number of encoded blocks included in each split block.

Alternatively, retrieval information of each spatially split block unit may be a total sum of the absolute values of motion vectors in each spatially split block divided by the number of split blocks (on a frame) constituting each spatially split block. The number of the split blocks in this case is equal to the number of frames constituting a scene. Furthermore, the retrieval information of each spatially split block unit may be a total sum of the absolute values of motion vectors in each spatially split block unit divided by the number of coded blocks included in split blocks (on a frame) constituting each spatially split block.

If a total sum of the absolute values of motion vectors is adopted as retrieval information of a temporally divided block or a spatially split block, a total sum of the absolute values of all of motion vectors included in a scene can be calculated. In the embodiment, the total sum thus obtained is used as retrieval information of a scene unit.

Figure 7:
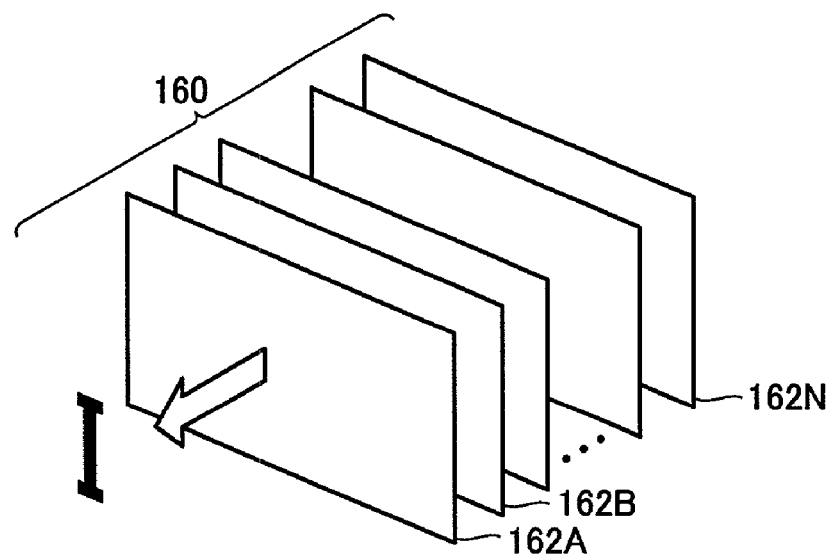
FIG. 7 is a representation for describing a concept of retrieval information of a scene unit in the motion picture retrieval information storage apparatus relating to the one embodiment of the present invention.

Then, description will be given of a specific example of a split block for use in generating retrieval information of a spatial split block unit. As shown in FIG. 7, it is assumed that scene 160 is constructed of frames 162A to 162N. Scene unit retrieval information I of scene 160 is obtained from a total sum of the absolute values of motion vectors of frames 162A to 162N.

Figure 8:
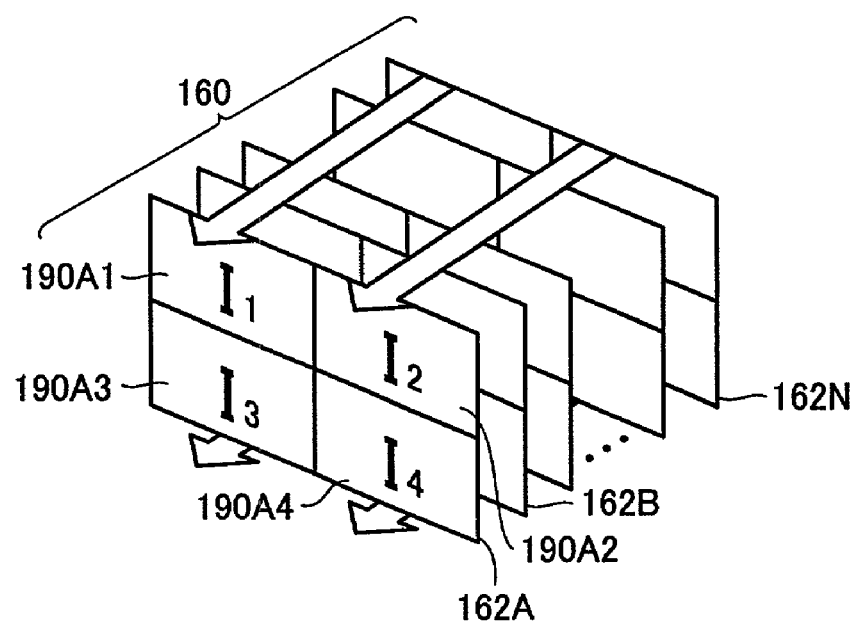
FIG. 8 is a representation for describing a concept of retrieval information of a spatially split block unit in the motion picture retrieval information storage apparatus relating to the one embodiment of the present invention.

As shown in FIG. 8, it is assumed that frames 162A to 162N are each split into 2×2 split blocks. That is, frames 162A to 162N are each split into 4 split blocks. For example, frame 162A is split into 4 split blocks 190A1 to 190A4. This applies to the other frames, not shown, in a similar manner. For example, frame 162B is split into frames 190B1 to 190B4. Accordingly, as can be seen from the previous description of a spatially split block, scene 160 is split into 4 spatially split blocks and retrieval information $I_1$ to $I_4$ of spatially split block units is obtained from a total sum of the absolute values of motion vectors in the respective 4 spatially split blocks, all as real numbers.

Accordingly, as scene retrieval information for scene 160, $\{I, I_1, I_2, I_3, I_4\}$ obtained by arranging retrieval information I, $I_1, I_2, I_3, I_4$ in ascending order can be used. The retrieval information has only to be stored together with the original picture data.

However, the above-described retrieval information includes redundancy. In this example, this means that scene unit retrieval information I is equal to the sum of retrieval information of spatial split block units. For example, scene unit retrieval information I can be obtained from retrieval information $I_1$ to $I_4$ of spatially split block units. Furthermore, one of retrieval information of spatially split block units can be calculated from the other three of retrieval information $I_1$ to $I_4$ of spatially split block units and scene unit retrieval information I.

Figure 9:
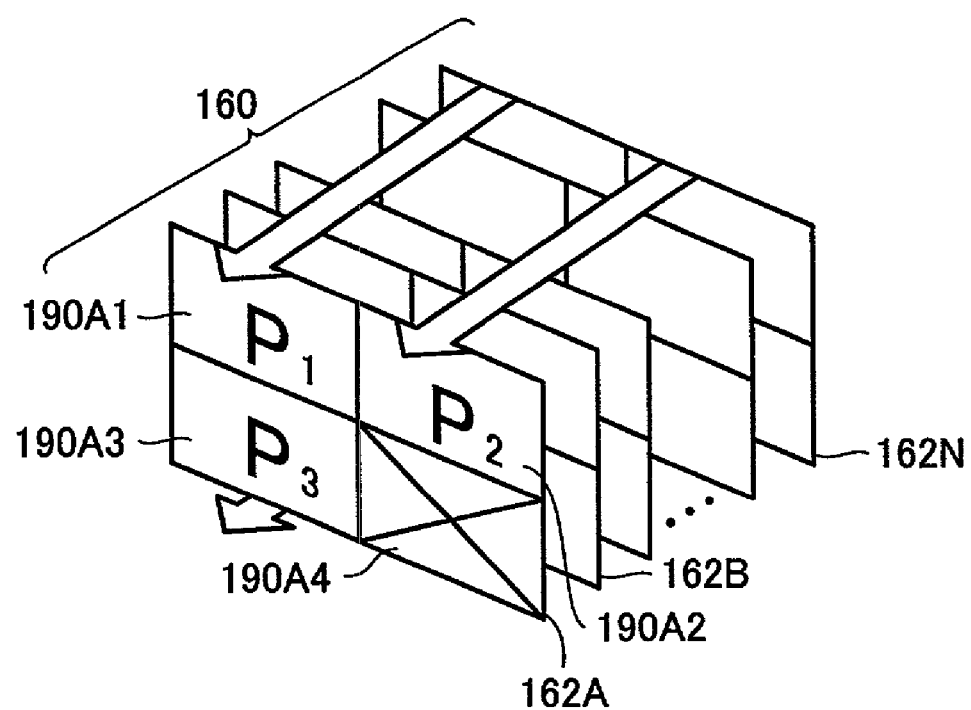
FIG. 9 is a representation for describing a concept of retrieval information in a spatially split block unit, excluding redundancy, in the motion picture retrieval information storage apparatus relating to the one embodiment of the present invention.

Therefore, in an apparatus of the embodiment, an operation is performed such that $I_4$ is not included in retrieval information. Moreover, in an apparatus of the embodiment, a value of each of the spatially split block unit retrieval information is shown as a percent thereof relative to retrieval information of a scene unit as 100 without using a value of an original value of each spatially split block unit retrieval information as it is. If ratios of the first to third spatially split block retrieval information to scene unit retrieval information I are assumed as $P_1$ and $P_2$ and $P_3$, retrieval information of spatially split block units at this time are obtained in a way as shown in FIG. 9. That is, retrieval information $P_1$ of the first spatially split block is calculated from retrieval information of the first spatially split block and the scene unit. Retrieval information $P_2$ of the second spatially split block is calculated from retrieval information of the second spatially split block and the scene unit. Retrieval information $P_3$ of the third spatially split block is calculated from retrieval information of the third spatially split block and the scene unit. Since redundancy arises if retrieval information of the fourth spatially split block is to be obtained, the retrieval information of the fourth spatially split block is not obtained. That is, scene 160 is split into 4 spatially split blocks and retrieval information of 3 ones of the 4 blocks has only to be obtained. In general, $P_k$ is obtained from an equation $P_k = 100 \times I_k / I$.

If retrieval information of spatially split blocks is stored as percents relative to the scene unit retrieval information as 100, advantages as described below can be attained. Firstly, since a dynamic range of a signal for storing retrieval information is restricted, retrieval information can be stored with more of efficiency. That is, an information amount to be stored decreases compared with a case of being not stored as a percent. Secondly, since a value of retrieval information is normalized, retrieval information attached to different scenes can be compared with each other. Thirdly, as described already, one variable to be stored can be omitted.

In such a way, motion picture retrieval information is generated by fourth retrieval information generating section 105 and stored into storage medium 107 through storage section 106.

Figure 10:
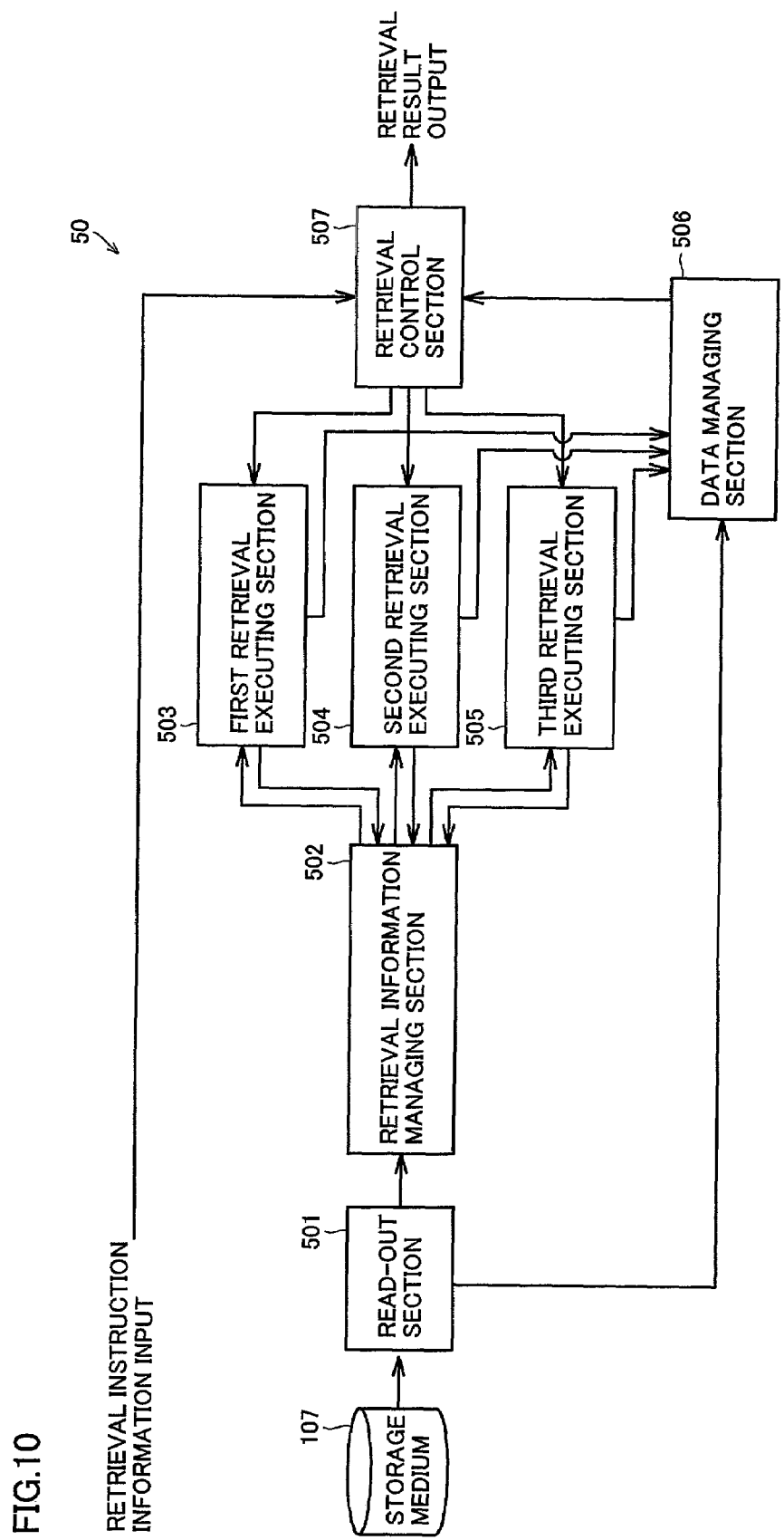
FIG. 10 is a block diagram of a motion picture retrieving apparatus relating to the one embodiment of the present invention.

Description will be given of an apparatus retrieving a motion picture by use of motion picture data and retrieval information stored in storage medium 107 with the help of motion picture retrieval information storage apparatus 40 shown in FIG. 3 below: Referring to FIG. 10, a motion picture retrieving apparatus 50 relating to the embodiment includes: a read-out section 501 for reading motion picture data and retrieval information therefor stored in storage medium 107; a retrieval information managing section 502 for holding the retrieval information of a motion picture read out by read-out section 501 to output scene unit retrieval information, spatially split block unit retrieval information or a temporally divided block unit retrieval information, in response to a retrieval request, together with motion picture structure information; a first retrieval executing section 503 for issuing a request to retrieval information managing section 502 in response to a scene unit retrieval request, receiving retrieval information of all of the scene and motion picture structure information from retrieval information managing section 502 and detecting a scene meeting the retrieval request for a scene unit to output information of the detected scene; a second retrieval executing section 504 for issuing a request to retrieval information managing section 502 in response to a retrieval request for a spatially split block unit and detecting a scene meeting the retrieval request on the basis of summary information of each of spatially split blocks in a scene and motion picture structure information, received from retrieval information managing section 502 to output information of the detected scene; a third retrieval executing section 505 for issuing a request to retrieval information managing section 502 in response to a retrieval request for a temporally divided block unit and detecting a scene or a frame meeting the retrieval request on the basis of summary information of each of frames in a scene and motion picture structure information received from retrieval information managing section 502 to output information of the detected scene or frame; a data managing section 506 for holding motion picture information read out by read-out section 501 and outputting picture data of a scene or a frame detected on the basis of a retrieval result outputted from first retrieval executing section 503, second retrieval executing section 504 or third retrieval executing section 505; and a retrieval control section 507 for issuing a retrieval request for a scene unit to first retrieval executing section 503, a retrieval request for a spatially split block unit to second retrieval executing section 504 or a retrieval request for a temporally divided block unit to third retrieval executing section 505 in response to inputting of a retrieval instruction from an operator, as a result displaying picture data of a scene or a frame outputted from data managing section 506 and outputting a retrieval result when a retrieval finishes.

This motion picture retrieving apparatus 50 operates as described below: At the start of retrieval, an operator gives a retrieval instruction to retrieval control section 507. Retrieval control section 507 selects one of retrieval in scene units, retrieval in spatially split block units or retrieval in temporally divided block units and issues a retrieval request to a corresponding one of first retrieval executing section 503, second retrieval executing section 504 and third retrieval executing section 505.

The corresponding one having received the retrieval request from retrieval control section 507 among first retrieval executing section 503, second retrieval executing section 504 and third retrieval executing section 505 detects a scene or a frame meeting the retrieval request on the basis of motion picture structure information, summary information of a scene unit, a spatially split block unit or a temporally divided block (frame) unit provided from retrieval information managing section 502 to provide information on the detected scene or frame to data managing section 506.

Data managing section 506 extracts a picture data of a scene or a frame from motion picture data, wherein the picture of a scene or a frame corresponds to information of detected scene or frame having received from first retrieval executing section 503, second retrieval executing section 504 or third retrieval executing section 505 to provide the picture data of a scene or frame to retrieval control section 507.

Retrieval control section 507 displays the picture provided from data managing section 506. The operator determines whether or not the picture is a desired scene to issue an instruction such that a retrieval result is outputted if the picture is the desired scene to retrieval control section 507. Retrieval control section 507 outputs the retrieval result in response to this instruction.

If the picture displayed by retrieval control section 507 is not one to express the desired scene, the operator gives a next retrieval instruction to retrieval control section 507. Retrieval control section 507 hereinafter performs a similar operation of the above-described to display a scene as a retrieval result. The operation is repeated till the retrieval finishes.

Description will be given of a concrete example of motion picture retrieval. In this embodiment, there is used information on a magnitude of a motion obtained on the basis of motion vectors included in motion picture data subjected to motion compensation prediction encoding.

A desired scene or a desired frame in a scene is retrieved as described below:

When using retrieval information in scene units, selection can be effected between a scene large in motion as a whole and a scene small in motion as a whole.

When using retrieval information in spatially split block units, selection can be effected, for example, between a scene having motions unevenly distributed in a space across the scene and a scene having motions comparatively evenly distributed in a space across the scene. Furthermore, it can be specified what portion of a picture motions are localized in. For example, selection can be effected on a scene having a portion (a subject to be shot) in vigorous motion in the middle part of a picture, a scene having a portion in vigorous motion in lower half of a picture (a picture including a portion of sky) or the like.

In the embodiment, retrieval information with a spatially split block, which was not conceived in the prior art, as a unit is used in retrieval of a scene. Therefore, the following effect is achieved.

Figure 11:
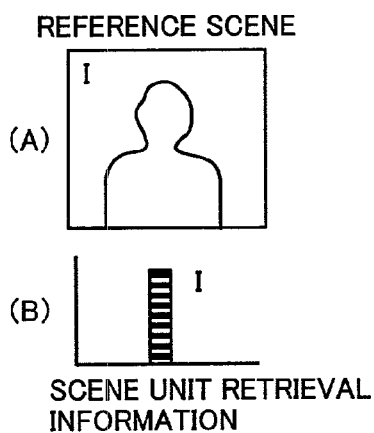
FIG. 11 is a pictorial diagram showing a scene of reference in similarity retrieval using scene unit retrieval information.
Figure 12:
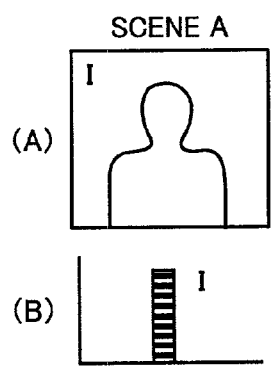
FIG. 12 is a pictorial diagram showing one scene in similarity retrieval using scene unit retrieval information.
Figure 13:
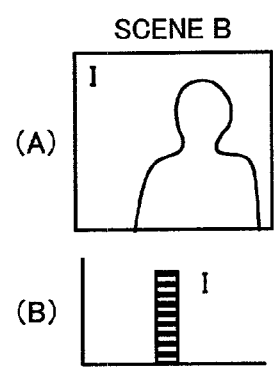
FIG. 13 is a pictorial diagram showing another scene in similarity retrieval using scene unit retrieval information.

Referring to FIGS. 11 to 13, a case is considered where a similarity to a scene of reference shown in FIG. 11(A) is calculated on a scene A shown in FIG. 12(A) and a scene B shown in FIG. 13(A). With such similarity calculation adopted, a scene having a motion feature analogous to the scene of reference can be detected. FIGS. 12 to 13 show cases in each of which only retrieval information of a scene unit is used.

In (B) parts of FIGS. 11 to 13, there are shown scene unit retrieval information for pictures shown in respective (A) parts of the figures. As shown in the (A) parts of FIGS. 11 to 13, a scene A and a scene B have a similar intensity of motion in the entirety thereof. For this reason, as shown in the (B) parts of FIGS. 11 to 13, scene unit retrieval information of each of the scenes is of a similar value. That is, scenes A and B are determined to be both analogous to the scene of reference.

Subsequent to this, referring to FIGS. 14 to 16, description will be given of a feature of similarity retrieval in a case where retrieval information in spatially split block units are adopted. In (A) parts of FIGS. 14 and 16, there are shown a scene of reference, scenes A and B, respectively. As shown in the figures, each frame of each of the scenes has four split blocks. Spatially split blocks unit retrieval information $P_1$, $P_2$ and $P_3$ are calculated for spatially split blocks consisted of respective three ones among the four split blocks of each scene. Furthermore, as shown in (B) parts of FIGS. 14 to 16, retrieval information in scene units of a scene of reference, scenes A and B is of almost the same value.

Figure 14:
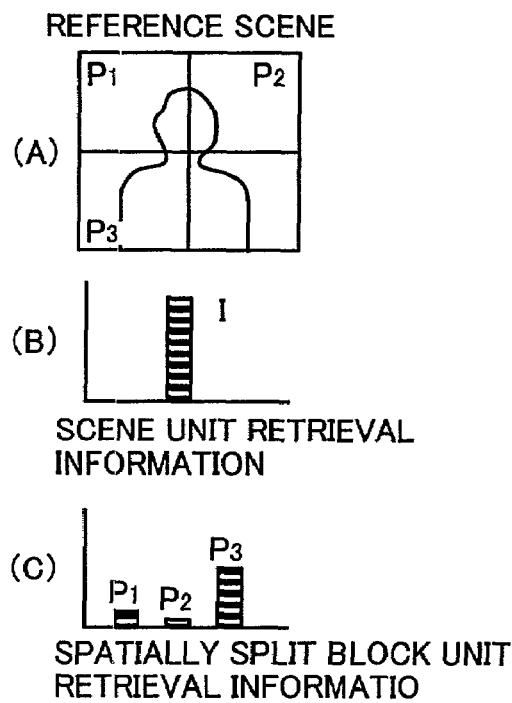
FIG. 14 is a pictorial diagram showing a scene of reference in similarity retrieval using spatially split block unit retrieval information.
Figure 15:
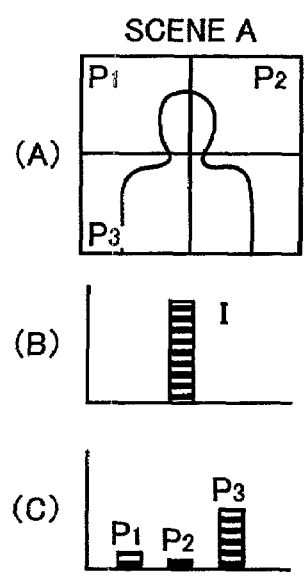
FIG. 15 is a pictorial diagram showing one scene in similarity retrieval using spatially split block unit retrieval information.
Figure 16:
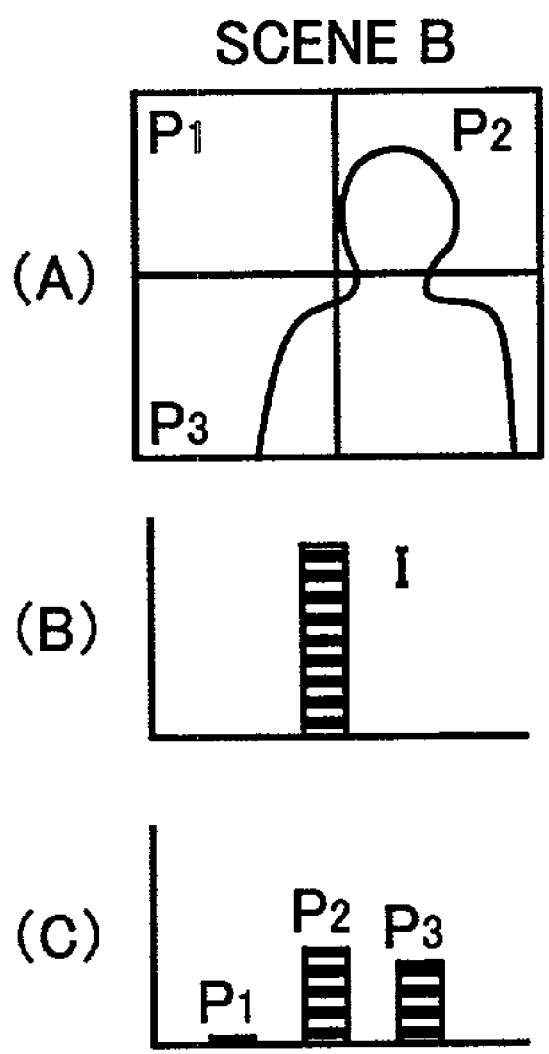
FIG. 16 is a pictorial diagram showing another scene in similarity retrieval using spatially split block unit retrieval information.

As shown in (C) parts of FIGS. 14 to 16, however, the following facts are found when the scenes are compared with each other in terms of retrieval information in spatially split block units. That is, scene A has a distribution more similar to a distribution of a spatially split block unit retrieval information of the scene of reference. This is because in scene B, a person is shifted to the right side, so uneven motions are observed spatially. The scene of reference and scene A both have a person almost in the middle of a picture. Therefore, while scene A is detected as a scene analogous to the scene of reference, scene B is not detected so. That is, even in a case where scenes A and B are analogous to the scene of reference in motion as a whole, scenes can be discriminated therebetween according to whether or not motions are unevenly distributed.

Furthermore, if retrieval information in frame (temporally divided block) units is utilized, for example, selection can be effected between a frame as in vigorous motion and a frame as in, to the contrary, no motion in a scene.

By combining retrieval information in scene units, retrieval information in spatially split block units and retrieval information in temporally divided block units, retrieval of a desired scene can be performed in more detailed manner.

For example, motion picture retrieval can be performed in such a way that scenes large in motion as a whole are selected, fewer scenes having a middle portion in vigorous motion are further selected and further fewer scenes or frames are taken out with a frame in especially vigorous motion as a key frame.

As described above, according to an apparatus of the embodiment, a desired scene picture can be retrieved efficiently on the basis of pictorial features such as motions of a picture by specifying conditions from multiple aspects. Furthermore, a time required for retrieval is also reduced.

The above-described embodiment is only one example for carrying out the present invention. Various modifications or alterations of the apparatuses can be performed in addition to the embodiment.

For example, in an apparatus of the embodiment, analysis section 101 automatically finds scene change points through signal analysis on motion picture data. The present invention, however, is not limited to this, but another procedure may be adopted in which for example, an operator sees a motion picture and analyzes a structure of the motion picture based on his or her personal point of view to attach a tag to a dividing position for dividing the motion picture into scenes. In this case, while analysis section 101 analyzes motion picture data in a similar manner, the motion picture is divided into scenes seeing tags attached to the motion picture data.

In the above-described embodiment, frequency information in frame of motion vectors in motion compensation prediction encoding is used as frequency information 166 of summary information of a frame. In the present invention, however, no limitation is imposed on this, but frequency information in frame in a predictive mode of each of coded blocks can also be used as frequency information.

Furthermore, as summary information, there may also be used a total sum or a standard deviation of motion vectors in frame, or the average luminance or the average color difference in frame calculated using an original picture signal or a decoded picture signal in addition to the above-described.

A method and procedure for retrieval are not limited to combinations shown here. Another possibility is to change the order in which candidates to be selected are screened. Moreover, a method and procedure for retrieval changes according to retrieval information to be generated as well.

Figure 17:
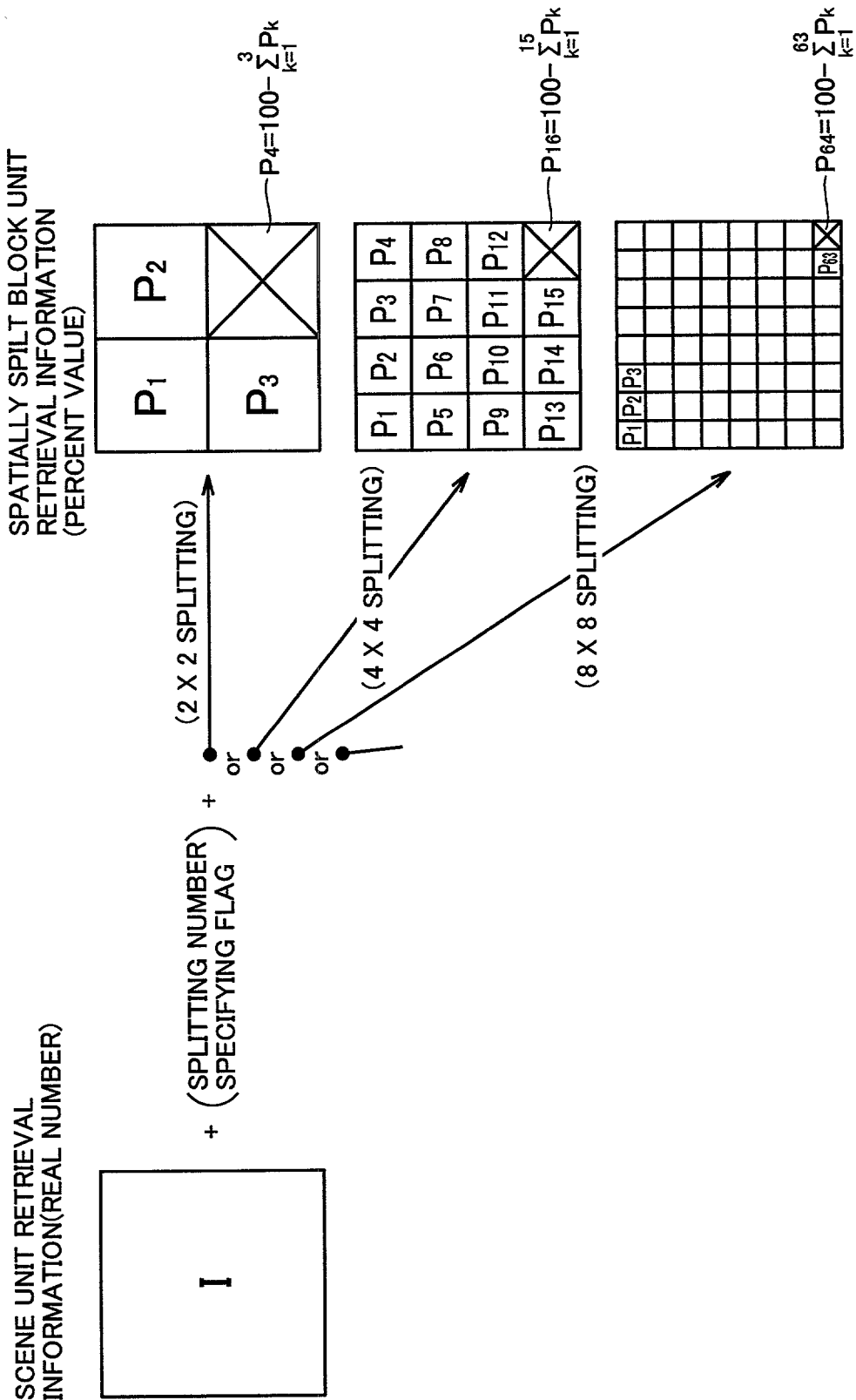
FIG. 17 is a representation for showing a concept of storage of scene unit retrieval information and selective storage of retrieval information of a spatially split block unit in the motion picture retrieval information storage apparatus relating to the one embodiment of the present invention.

In addition, for example, in an apparatus of the above-described embodiment, there was adopted a collection across one scene of split blocks each obtained by splitting a frame into 2×2=4 parts as a spatially split block. The number of split parts is not limited to four. For example, as shown in FIG. 17, possibility is to split a frame into 4×4, 8×8 or a number larger than the latter. In a case of 4×4 splitting, spatially split block unit retrieval information are expressed by a percent ranges from $P_1$ to $P_{15}$. $P_{16}$ can be obtained by subtracting the sum of retrieval information of the other spatially split blocks from 100%. In a case of 8×8 splitting, spatially split block unit retrieval information are expressed by a percent ranges $P_1$ to $P_{63}$. $P_{64}$ can also be obtained by subtracting the sum of retrieval information of the other spatially split blocks from 100%.

Moreover, any of a plurality of splitting methods such as above-described may be selectively used. In this case, spatially split blocks are each constructed of split blocks each split according to the number of parts selected (, which can be called as "resolution.") to obtain retrieval information of each spatially split block. Besides, when retrieval information is stored, in addition to scene unit retrieval information and retrieval information in spatial split block units according to a selected resolution, a splitting number specifying flag with correspondence between the value thereof and the splitting number shown in FIG. 18 is attached to retrieval information. If the splitting number specifying flag is "0," retrieval information in spatially split block units $\{P_1, P_2, P_3\}$ is stored; if the splitting number specifying flag is "1," retrieval information of spatially split block units $\{P_1, P_2, \ldots, P_{15}\}$ is stored; if the splitting number specifying flag is "2," retrieval information of spatially split block units {$P_1$, $P_2$, ..., $P_{63}$} is stored and if the splitting number specifying flag is "3," retrieval information of spatially split block units {$P_1$, $P_2$, ..., $P_{255}$} is stored.

By enabling resolutions of spatially split blocks to be specified in a plurality of ways, the following effects arise:

In a data base in which only a comparatively simple and easy retrieval is required in which a rough distribution of motions of a motion picture, upward or downward, or leftward or rightward, is desired to know, a small splitting number is used: such as 2×2. A storage amount of retrieval information can be suppressed.

In a data base where a request frequently arises for extracting a scene large in motion in a specific portion of a picture or two portions spaced apart from each other thereof, a comparatively large splitting number is used: such as 8×8. A highly functional retrieval can be realized. Retrieval information of a high resolution includes retrieval information of a low resolution; therefore, the retrieval information of a low resolution is not necessary to be additionally provided in duplication even when the retrieval information of a low resolution is required.

In the above-described embodiment, the numbers of splittings in longitudinal direction and lateral direction are equal to each other as in cases of 2×2, 4×4 and 8×8 and each of the numbers are 2 to the nth power, where n is a natural number. When such a splitting number is selectively used, a correspondence can be possible between retrieval information from data bases storing spatially split block unit retrieval information having respective different splitting resolutions. Furthermore, retrieval information having different splitting resolutions can also be compared with each other.

Figure 19:
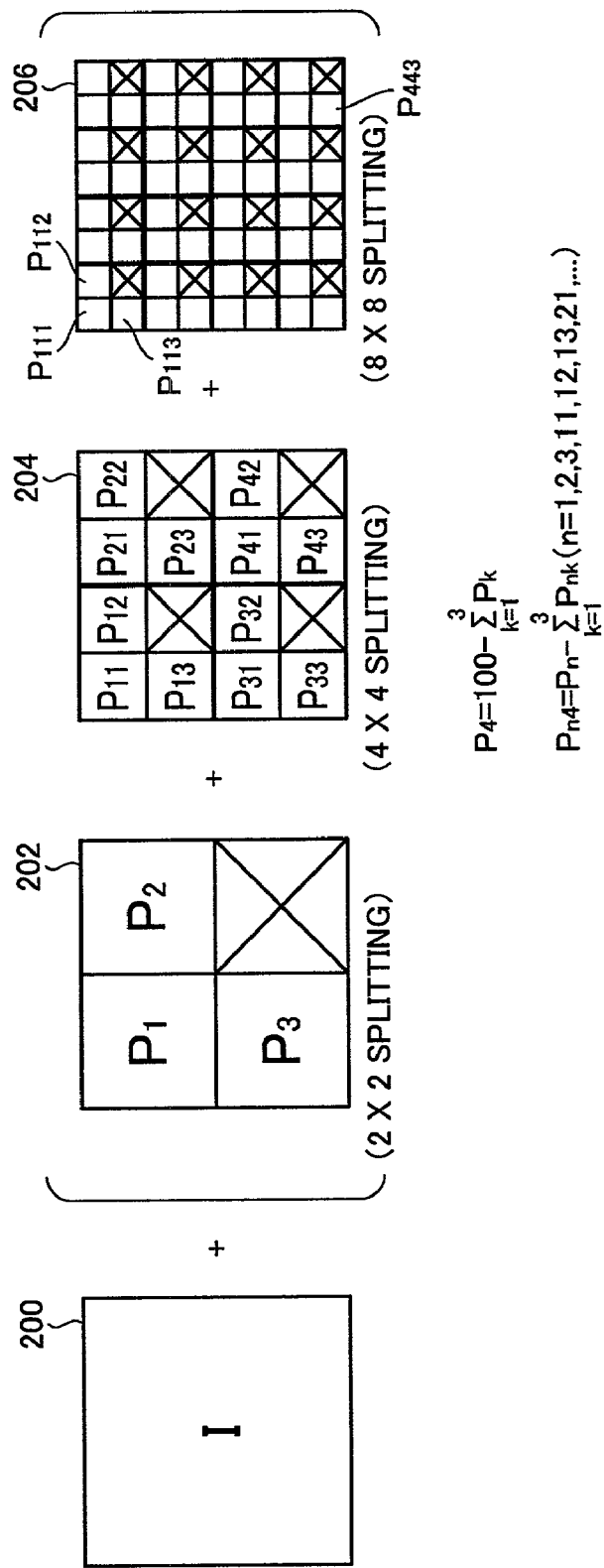
FIG. 19 is a representation expressing a concept of storage of scene unit retrieval information and hierarchical storage of retrieval information of a spatially split block unit in the motion picture retrieval information storage apparatus relating to the one embodiment of the present invention.
Figure 20:
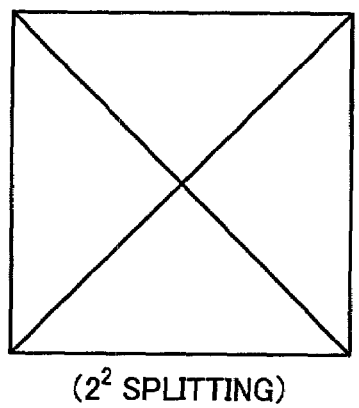
FIG. 20 is a representation showing an example splitting when a frame is split into $2^2$ parts.
Figure 21:
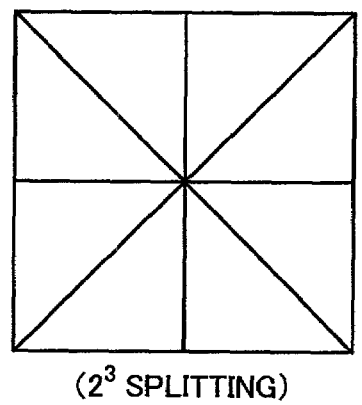
FIG. 21 is a representation showing an example splitting when a frame is split into $2^3$ parts.
Figure 22:
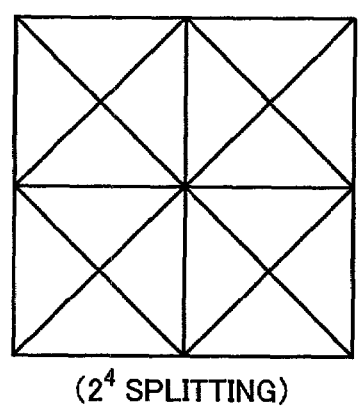
FIG. 22 is a representation showing an example splitting when a frame is split into $2^4$ parts.
Figure 23:
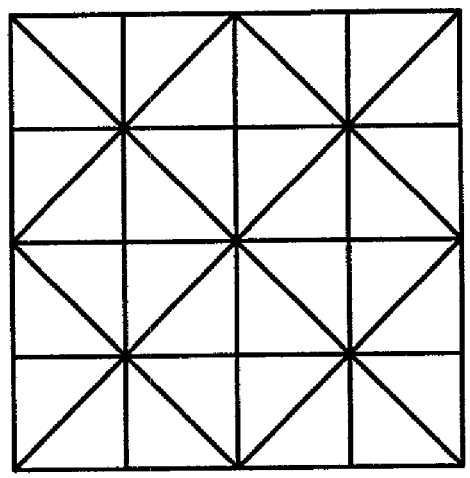
FIG. 23 is a representation showing an example splitting when a frame is split into $2^5$ parts.
Figure 24:
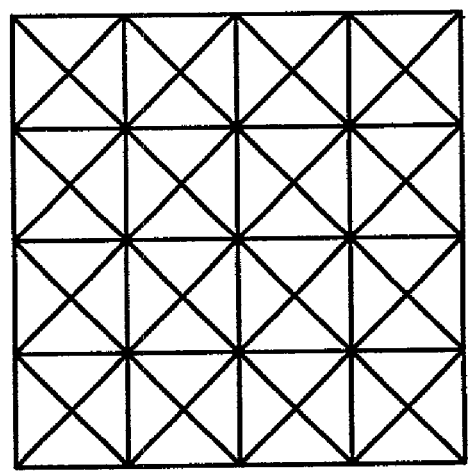
FIG. 24 is a representation showing an example splitting when a frame is split into $2^6$ parts.

Moreover, as shown in FIG. 19, hierarchical storage may be effected of retrieval information in spatially split block units with respective several levels of resolutions. For example, retrieval information of a scene includes retrieval information 200 of a scene unit, retrieval information 202 in spatially split block units according to 2×2 splitting, retrieval information 204 in spatially split block units according to 4×4 splitting and retrieval information 206 in spatially split block units according to 8×8 splitting.

In the hierarchical structure, retrieval information of a spatially split block unit in a layer is expressed with retrieval information in 4 spatially split block units of a one-step higher resolution. Therefore, even in a case where in each layer, one of retrieval information of four spatially split block units is not stored, all the information required for retrieval can be obtained.

Retrieval information according to the example shown in FIG. 19 includes retrieval information with the same resolution as in storage of retrieval information with a spatially split block, as a unit, formed by splitting a frame into 8×8 parts, shown in FIG. 17. On the other hand, according to retrieval information shown in FIG. 19, an advantage arises that retrieval information of other resolutions can be obtained with ease.

In the above-described embodiment, all the frames of a scene are split in n×n arrangements such as 2×2, 4×4 and 8×8 to form spatially split blocks. According to the present invention, however, splitting methods for a frame are not limited to those. For example, a splitting method may be adopted in which a frame is split in ways as shown in FIGS. 20 to 24 and retrieval information is generated using thus obtained spatially split blocks as units. In examples shown in FIGS. 20 to 24, all the frames in a scene are split into 2 to nth power ($2^n$) (n=2 in FIG. 20, n=3 in FIG. 21, n=4 in FIG. 22, n=5 in FIG. 23 and n=6 in FIG. 24). Even when such splitting methods are used, retrieval information can be generated for realizing a similar retrieval function of that obtained in an apparatus of the above-described embodiment.

By the splitting methods for a frame as shown in FIGS. 20 to 24 as well, correspondence between retrieval information having respective different resolutions is easy in a similar way of the above-described embodiment. Furthermore, easy comparison can be effected between retrieval information having respective different resolutions.

Note that in an example shown in FIG. 5, for example, summary information is obtained with frame 162N as one temporally divided block 164N. However, the present invention is not limited to such an example. For example, one temporally divided block may include two or more frames. Furthermore, it may be adopted that each frame is sub-sampled to form subframes so that one temporally split block includes one or a plurality of subframes. Still furthermore, it may be adopted that frames in a scene are partly removed in a proper manner and summary information of the remaining frames is used.

Note that in the examples shown in FIGS. 6 and 8, summary information of a spatially split block is obtained using all of the split blocks included in the spatially split block. The present invention, however, is not limited to such examples. It is not necessarily required to use picture data corresponding to all of the split blocks in a spatially split block but it is allowed that the split blocks are partly removed in a proper manner or picture data in each split block is partly removed in a proper manner to form summary information of the spatially split block.

Note that when generating retrieval information in temporally divided block units or in spatially split block units or retrieval information in scene units, which are described above with reference to FIGS. 5 and 6, in order to remove an influence of motions of a camera shooting a motion picture on motions of the background, retrieval information may be generated, correcting an influence due to motion vectors corresponding to the motions of a camera.

Moreover, in the above-described embodiment, the motion picture retrieval information storage apparatus 40 and motion picture retrieving apparatus 50 are separate apparatuses. Retrieval information is transferred from motion picture retrieval information storage apparatus 40 to motion picture retrieving apparatus 50 through storage medium 107. Instead of this configuration, for example, kinds of retrieval information generated by first retrieval information generating section 102, second retrieval information generating section 103 and third retrieval information generating section 104, shown in FIG. 3, may be transferred directly to retrieval information managing section 502 of FIG. 10 together with motion picture structure information outputted from analysis section 101. Retrieval processing in this case is a so-called real time retrieval.

Split blocks obtained by splitting a frame in the above-described embodiment may coincide with encoded blocks. Blocks of a proper size may be newly defined differently from encoded blocks. In the above-described embodiment, split blocks are of symmetrical shape and arrangement of split blocks is also symmetrical. When split blocks are newly defined, however, no necessity arises for shape of blocks being symmetrical. Furthermore, no necessity arises for arrangement of split blocks being symmetrical either. Still further, partly removal in a picture plane can be properly effected. That is, a region which is not included in any split block may be present in a picture plane. Moreover, split blocks may be partly overlapped on each other. That is, a region which is included in a plurality of split blocks may be present in a picture plane.

In the above-described embodiment, third retrieval information generating section 104 shown in FIG. 3 receives summary information outputted from first retrieval information generating section 102 and summary information outputted from second retrieval information generating section 103 to generate summary information of all of a scene. The present invention, however, is not limited to such an example. For example, third retrieval information generating section 104 may generate summary information of all of a scene directly from input picture data.

In addition, in the above-described embodiment, various kinds of summary information (retrieval information) is obtained with one scene physically defined as a unit. However, retrieval information is not necessarily required to be obtained with a scene as a unit. For example, retrieval information may be obtained with a subscene obtained by dividing one scene into a plurality of parts, as a unit. That is, the word "scene" also means "subscene." To the contrary, retrieval information can also be obtained with a composite scene composed of a plurality of scenes, as a unit. That is, the word "a scene" also means "a collection of plural scenes."

Furthermore, while retrieval information is generated for one motion picture data and stored and retrieval is executed in the above-described embodiment, the present invention is not limited to such an example. That is, a case is considered where a plurality of motion picture data is adopted as an object for retrieval, retrieval information is generated and stored, and a desired scene or a desired frame is retrieved among a plurality of pieces of motion picture data.

Figure 25:
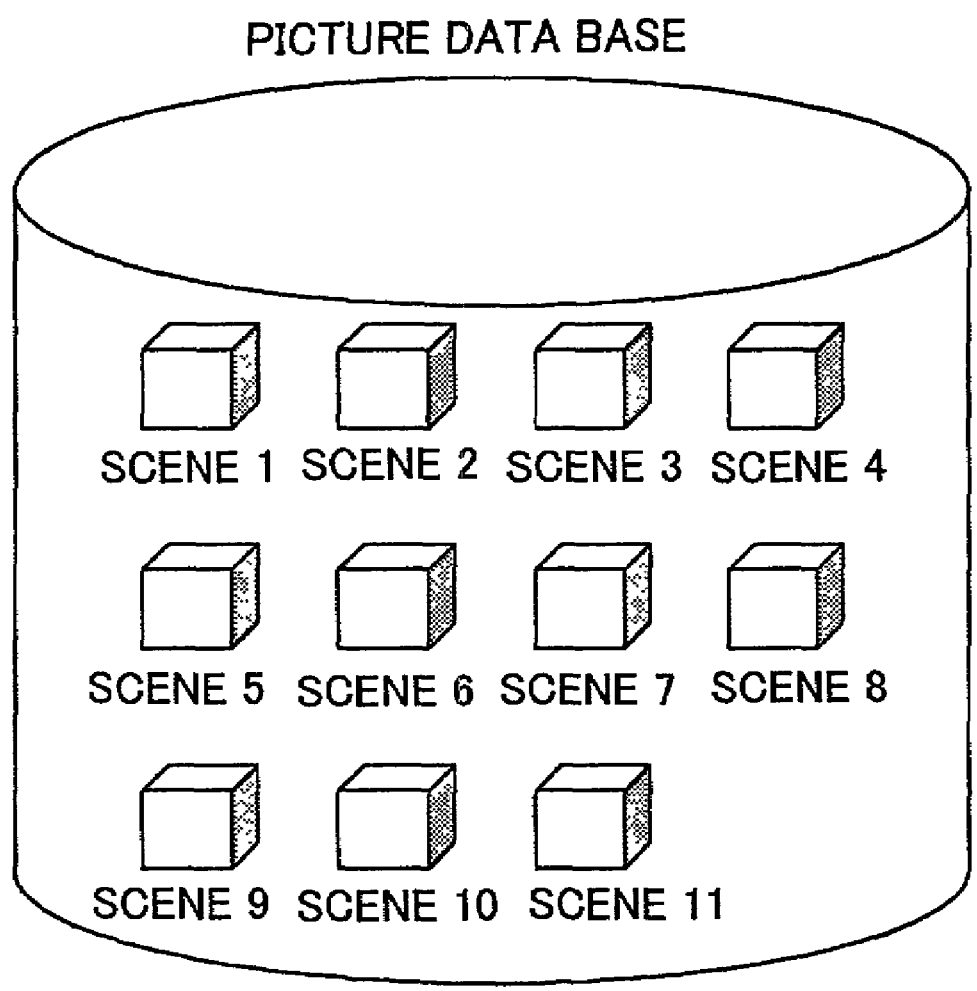
FIG. 25 is a representation showing a motion picture data base in which motion picture data is stored being divided into scene units.

As an example of the case, there is considered retrieval of motion picture from a picture data base, shown in FIG. 25, in which each of a plurality of scenes is stored as motion picture data, independent from the other. In a case where shooting of a motion picture is performed using a digital camera or the like capable of shooting a motion picture, available in recent years, each of motion pictures shot, that is motion picture data expressing one scene of one time picture recording from start to end is generated as a data file independent from the others. Therefore, the picture data base as shown in FIG. 25 can be conceived with ease.

Retrieval information is generated by motion picture retrieval information storage apparatus 40 shown in FIG. 3 for such a picture data base. At this time, inputted motion picture data is plural pieces of motion picture data present in the data base. Stored picture data is already divided into scenes (one motion picture data includes one scene only); therefore, no necessity arises for motion picture structure information. Therefore, in analysis section 101, no necessity arises for a structural analysis for a motion picture. First, second and third retrieval information generating sections 102, 103 and 104 generate respective summary information of a frame (a temporally divided block), a spatially split block and all of a scene. Fourth retrieval information generating section 105 generates retrieval information of a motion picture, arranging summary information from the sections into a prescribed format. Storage section 106 receives each motion picture data and retrieval information corresponding to each of the motion pictures to store correspondence information between each motion picture data and the retrieval information, attaching to one or both of the motion picture data and the retrieval information, or as separate data therefrom, into storage medium 107. Storage medium 107 may be provided in a data base for the original picture. Moreover, each of retrieval information may be stored either independently from the others or collectively as retrieval information corresponding to a picture data base.

Furthermore, retrieval is executed by the motion picture retrieving apparatus shown in FIG. 10 using such a picture data base and retrieval information generated and stored. At this time, information read out by read-out section 501 and managed by retrieval information managing apparatus 502 is retrieval information corresponding to a plurality of pieces of motion picture data present in a data base and no necessity arises for motion picture structure information corresponding to each of motion picture data. First, second and third retrieval executing sections 503, 504 and 505 detect a scene or a frame meeting a retrieval request using corresponding retrieval information to output information on the detected scene or frame. Data managing section 506 and retrieval control section 507 operate in a similar manner of the above-described embodiment to obtain a retrieval result.

The embodiment disclosed this time should be construed by way of illustration and example but not by way of limitation in all aspects. It is intended that the scope of the present invention is not the above-described description but shown by the terms of the claims and includes all of modifications or alterations within the claims literally and in the sense of equivalence.

INDUSTRIAL APPLICABILITY

As described above, a motion picture retrieval information storage apparatus and a motion picture retrieving apparatus relating to the present invention generates retrieval information of a scene with a spatially split block obtained not by temporally divided the scene but by spatially splitting the scene, as a unit, to retrieve a scene on the basis of the retrieval information; therefore, the apparatuses are suited for use in a system in which a desired scene among motion pictures is efficiently retrieved according to a spatial feature observed through the scene.

The invention claimed is:

1. A motion picture retrieval information generating apparatus (40) that generates retrieval information for retrieving motion picture data constituted of one or more scenes (140, 142, 144, 146, 160), comprising:
a retrieval information generating section (102, 103, 104, 105) that generates retrieval information corresponding to each of said one or more scenes on the basis of said motion picture data, and
wherein said retrieval information generating section (102, 103, 104, 105) comprises:
a first summary information generating means (103) for forming plural spatially split blocks having a length of each of said scenes in a direction of the time axis obtained by spatially splitting said each of said scenes (140, 142, 144, 146, 160) to generate summary information (188) of a spatially split block unit, and
wherein said first summary information generating means (103) splits each of said scenes (140, 142, 144, 146, 160) into 2 to the nth power parts, n being a predetermined number.

2. The motion picture retrieval informational generating apparatus according to claim 1, wherein said retrieval information generating section (102, 103, 104, 105) further comprises:
a second summary informational generating means (102) for temporally dividing each of said scenes (140, 142, 144, 146, 160) to form plural temporally divided blocks having a picture size of said each of said scenes spatially and to generate summary information of a temporally divided block unit.

3. The motion picture retrieval information generating apparatus according to claim 2, wherein said retrieval information generating section (102, 103, 104, 105) further comprises:
a third summary information generating means (104) for generating summary information of all of each of said scenes (140, 142, 144, 146, 160).

4. A motion picture retrieval information generating apparatus (40) that generates retrieval information for retrieving motion picture data constituted of one or more scenes (140, 142, 144, 146, 160), comprising:
a retrieval information generating section (102, 103, 104, 105) that generates retrieval information corresponding to each of said one or more scenes on the basis of said motion picture data, and
wherein said retrieval information generating section (102, 103, 104, 105) comprises:
a first summary information generating means (103) for forming plural spatially split blocks of a scene which are obtained by spatially spilling said scene and which have a length of said scene in a direction of the time axis and for generating summary information (188) of said scene generated by calculating statistics of motion picture data within each of said spatially split blocks of said scene, wherein said first summary information generating means (103) spatially splits each of said scenes (140, 142, 144, 146, 160) into a predetermined number of parts in each of two directions defined spatially,
a second summary information generating means (102) for temporally dividing each of said scenes (140, 142, 144, 146, 160) to form plural temporally divided blocks having a picture size of said each of said scenes spatially and to generate summary information of a temporally divided block unit, and
a third summary information generating means (104) for generating summary information of all of each of said scenes (140, 142, 144, 146, 160).

5. The motion picture retrieval information generating apparatus (40) according to claim 1, wherein said retrieval information generating section (102, 103, 104, 105) further comprises:
a third summary information generating means (104) for generating summary information of all of each of said scenes (140, 142, 144, 146, 160).

6. A motion picture retrieval information generating apparatus (40) that generates retrieval information for retrieving motion picture data constituted of one or more scenes (140, 142, 144, 146, 160), comprising:
a retrieval information generating section (102, 103, 104, 105) that generates retrieval information corresponding to each of said one or more scenes on the basis of said motion picture data, and
wherein said retrieval information generating section (102, 103, 104, 105) comprises:
a first summary information generating means (103) for forming plural spatially split blocks of a scene which are obtained by spatially splitting said scene and which have a length of said scene in a direction of the time axis and for generating summary information (188) of said scene generated by calculating statistics of motion picture data within each of said spatially split blocks of said scene, and a third summary information generating means (104) for generating summary information of all of each of said scenes (140, 142, 144, 146, 160).

7. A motion picture retrieving apparatus (50) for retrieving a desired picture using retrieval information corresponding to each of one or more scenes (140, 142, 144, 146, 160) constituting motion picture data, in which said motion pictures data is related with said retrieval information and said retrieval information comprises summary information (188) for each of said one or more scenes, said retrieval information further comprising summary information with plural temporally divided blocks having a picture size of each of said scenes spatially, obtained by temporally dividing said each of said scenes (140, 142, 144, 146, 160) as a unit, and summary information with each of said scenes (140, 142, 144, 146, 160) as a unit, said motion picture retrieving apparatus comprising:
information managing means (501, 502) for reading and managing said retrieval information;
first scene retrieving means (504), being connected with said information managing means and for retrieving a scene (140, 142, 144, 146, 160) meeting a first retrieval request in response to said first retrieval request with a scene (140, 142, 144, 146, 160) as a retrieval unit, provided from the outside, using said summary information included in said retrieval information;
wherein said summary information is statistics of motion picture data within spatially split blocks of said one or more scenes, the spatially split blocks of a scene are obtained by spatially splitting said scene and have a length of said scene in a direction of the time axis;
second scene retrieving means (505), being connected to said information managing means (501, 502) for retrieving a scene (140, 142, 144, 146, 160) meeting a second retrieval request in response to said second retrieval request with a scene (140, 142, 144, 146, 160) as a retrieval unit, provided from the outside, using said summary information of a temporally divided block unit included in said retrieval information; and
third scene retrieving means (503), being connected with said information managing means (501, 502), and for retrieving a scene (140, 142, 144, 146, 160) meeting a third retrieval request in response to said third retrieval request with a scene (140, 142, 144, 146, 160) as a retrieval unit, provided from the outside, using said summary information with a scene (140, 142, 144, 146, 160) as a unit included in said retrieval information.

8. A motion picture retrieval information managing apparatus for managing retrieval information corresponding to each of one or more scenes (140, 142, 144, 146, 160), constituting motion picture data, wherein said motion picture data is related with said retrieval information and said retrieval information comprises summary information (188) for each of said one or more scenes, comprising:
a read-out section (501) that reads out said retrieval information;
a retrieval information managing section (502) that holds retrieval information read out by said read-out section (501) and outputs said summary information included in said retrieval information in response to a first retrieval request with a scene (140, 142, 144, 146, 160) as a retrieval unit, provided from the outside;
wherein said summary information is statistics of motion picture data within spatially split blocks of said one or more scenes, the spatially split blocks of a scene are obtained by spatially splitting said scene and have a length of said scene in a direction of the time axis;

wherein said retrieval information further comprises summary information with plural temporally divided blocks having a picture size of each of said scenes spatially, obtained by temporally dividing said each of said scenes (140, 142, 144, 146, 160) as a unit, and said retrieval information managing section (502) further outputs said summary information of a temporally divided block unit included in said retrieval information in response to a second retrieval request with a scene (140, 142, 144, 160) as a retrieval unit, provided from the outside; and wherein said retrieval information further comprises summary information with each of said scenes (140, 142, 144, 146, 160) as a unit, and wherein said retrieval information managing section (502) further outputs said summary information with a scene (140, 142, 144, 146, 160) as a unit included in said retrieval information in response to a third retrieval request with a scene (140, 142, 144, 146, 160) as a retrieval unit, provided from the outside.

9. A motion picture retrieval information generating apparatus (40) that generates retrieval information for retrieving motion picture data constituted of one or more scenes (140, 142, 144, 146, 160), comprising:

a motion picture structure information outputting section (101) for analyzing the motion picture data and outputting motion picture structure information expressing positions, in said motion picture data, of each of said one or more scenes, a retrieval information generating section (102, 103, 104, 105) that generates retrieval information corresponding to each of said one or more scenes on the basis of said motion picture data and said motion picture structure information outputted responsive to the motion picture data and the outputted motion picture structure information, and wherein said retrieval information generating section (102, 103, 104, 105) comprises:

a first summary information generating means (103), being responsive to the motion picture data and the outputted motion picture structure information, for forming a plurality of spatially split blocks, each of the plurality of spatially split blocks having a temporal length of each of said scenes in a direction of the time axis, the plurality of spatially split blocks being obtained by spatially splitting said each of said scenes (140, 142, 144, 146, 160) and for generating summary information (188) for each of the plurality of spatially split blocks, and wherein the summary information being generated by said first summary information generating means (103) for each of the plurality of spatially split blocks comprises frequency information and average information.

10. The motion picture retrieval information generating apparatus according to claim 9, wherein:

each of said scenes (140, 142, 144, 146, 160) are obtained by dividing consecutive motion picture data on a time axis, and wherein said retrieval information generating section (102, 103, 104, 105) generates retrieval information corresponding to each of said scenes (140, 142, 144, 146, 160).

11. The motion picture retrieval information generating apparatus according to claim 9, wherein said first summary information generating means (103) spatially splits each of said scenes (140, 142, 144, 146, 160) into a predetermined number of parts in each of two directions defined spatially and so that each if the predetermined number of parts has a length along the direction of the time axis of each of said scenes.

12. The motion picture retrieval information generating apparatus of any of claim 1 or 9 wherein:

each of said one or more scenes is composed of a plurality of frames, each of said plurality of frames is spatially split in a fashion corresponding to the spatial splitting of said each scene, and the summary information for each spatially split block of said each scene represents the information of at least a plurality of the corresponding spatial split blocks of the plurality of or more frames making up said each scene.

13. The motion picture retrieval information generating apparatus of any of claim 1 or 9 wherein:

each of said one or more scenes is composed of a plurality of frames, each of said plurality of frames is spatially split in a fashion corresponding to the spatial splitting of said each scene, and the summary information for each spatially split block of said each scene represents the information of all of the corresponding spatial split blocks of the plurality of frames making up said each scene.

\* \* \* \* \*

UNITED STATES PATENT AND TRADEMARK OFFICE
CERTIFICATE OF CORRECTION

PATENT NO. : 7,092,040 B1  Page 1 of 1
APPLICATION NO. : 10/019747
DATED : August 15, 2006
INVENTOR(S) : Shuichi Watanabe It is certified that error appears in the above-identified patent and that said Letters Patent is hereby corrected as shown below:

Title Page:
Item [22]
PCT Filed delete "June 30, 2000" and replace with --June 29, 2000--.

In the Claims:

Claim 2, col. 20, lines 61 and 65, delete "informational" and replace with --information--.

Claim 4, col. 21, line 23 delete "spilling" and replace with --splitting--.

Claim 11, col. 24, line 21 rewrite "each if the" to read as --each of the--.

Claim 12, col. 24, line 35 delete "or more" between "of" and "frames".

Signed and Sealed this

Sixteenth Day of January, 2007

JON W. DUDAS
*Director of the United States Patent and Trademark Office*